US009412304B2

(12) United States Patent
Park et al.

(10) Patent No.: US 9,412,304 B2
(45) Date of Patent: Aug. 9, 2016

(54) DISPLAY DEVICE AND METHOD FOR DRIVING THE SAME

(71) Applicant: LG Display Co., Ltd., Seoul (KR)

(72) Inventors: Dongwon Park, Goyang-si (KR); Heejung Hong, Seoul (KR); Younghwan Ahn, Paju-si (KR); Jongmin Park, Anyang-si (KR); Joonhee Lee, Seoul (KR); Yongchul Kwon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/965,726

(22) Filed: Dec. 10, 2015

(65) Prior Publication Data

US 2016/0189619 A1 Jun. 30, 2016

(30) Foreign Application Priority Data

Dec. 24, 2014 (KR) ........................ 10-2014-0188872

(51) Int. Cl.
*H04W 4/00* (2009.01)
*G09G 3/32* (2016.01)

(52) U.S. Cl.
CPC .......... *G09G 3/3258* (2013.01); *G09G 2310/08* (2013.01); *G09G 2320/02* (2013.01); *G09G 2330/021* (2013.01); *G09G 2330/04* (2013.01); *G09G 2360/16* (2013.01)

(58) Field of Classification Search
CPC ....... H04W 4/00; H04W 4/046; H04W 12/06; H04W 12/08; H04W 76/021; H04W 36/0005; H04W 36/32; H04W 36/34
See application file for complete search history.

(56) References Cited

U.S. PATENT DOCUMENTS

2006/0012708 A1 1/2006 Rosmalen
2009/0207160 A1 * 8/2009 Shirasaki ............. G09G 3/3233 345/212
2011/0273482 A1 11/2011 Massart et al.

OTHER PUBLICATIONS

European Extended Search Report, European Application No. 15200646.6, May 24, 2016, 8 pages.

* cited by examiner

*Primary Examiner* — Michael Faragalla
(74) *Attorney, Agent, or Firm* — Fenwick & West LLP

(57) ABSTRACT

A special mode processor drives a display panel to display an image. When the display panel is configured to operate in a special operation mode, the special operation mode processor determines a pixel block size for blocking the plurality of pixels into a plurality of pixel blocks and determines a first set of on-pixels and a first set of off-pixels. The first set of on-pixels is initially turned on and the first set of off-pixels is initially turned off. A drive history representative value is generated for the first group of pixels that represents a drive time and drive characteristic for the first group of pixels. The drive history representative value is compared with a threshold value. Responsive to the drive history representative value exceeding the threshold value, a second set of on-pixels and a second set of off-pixels are turned on and off respectively.

20 Claims, 24 Drawing Sheets

DISPLAY DEVICE AND METHOD FOR DRIVING THE SAME

This application claims the benefit of Korean Patent Application No. 10-2014-0188872 filed on Dec. 24, 2014, the entire contents of which is incorporated herein by reference for all purposes as if fully set forth herein.

BACKGROUND OF THE INVENTION

1. Field of the Invention

Embodiments of the invention relate to a display device and a method for driving the same.

2. Discussion of the Related Art

Various flat panel displays such as a liquid crystal display (LCD), an organic light emitting diode (OLED) display, a plasma display panel (PDP), and a field emission display (FED) haven been used.

The liquid crystal display displays an image by controlling an electric field applied to liquid crystal molecules based on a data voltage. An active matrix liquid crystal display reduces the manufacturing cost and improves a performance due to the development of process technology and driving technology. Hence, the active matrix liquid crystal display is applied to almost all of display devices from a small-sized mobile device to a large-sized television and has been widely used.

The OLED display displays an input image using a phenomenon, in which the OLED of a pixel emits light when electrons and holes are combined in an organic layer through a current flowing in a fluorescence or phosphorescence organic thin film. Because the OLED display is a self-emission display device, the OLED display may be manufactured to have lower power consumption and thinner profile than the liquid crystal display requiring a backlight unit. Further, the OLED display has advantages of a wide viewing angle and a fast response time. As a process technology of the OLED display has been developed to a large-screen mass production technology, the OLED display has expanded its market while competing with the liquid crystal display.

Each pixel of the OLED display includes an organic light emitting diode (OLED) having a self-emitting structure. An organic compound layer including a hole injection layer HIL, a hole transport layer HTL, an emission layer EML, an electron transport layer ETL, an electron injection layer EIL, etc. is stacked between an anode and a cathode of the OLED.

The OLED display may be variously classified depending on kinds of emission materials, an emission method, an emission structure, a driving method, and the like. The OLED display may be classified into a fluorescent emission type and a phosphorescent emission type depending on the emission method. Further, the OLED display may be classified into a top emission type and a bottom emission type depending on the emission structure. Further, the OLED display may be classified into a passive matrix OLED (PMOLED) display and an active matrix OLED (AMOLED) display depending on the driving method. It is easy to implement the OLED display as a transparent display.

Each pixel of the OLED display includes a driving thin film transistor (TFT) controlling a driving current flowing in the OLED depending on data of the input image. Device characteristics of the driving TFT, such as a threshold voltage and a mobility of the driving TFT, may change depending on a process deviation, a driving time, a driving environment, etc. The pixels of the OLED display are degraded due to changes in the device characteristics of the driving TFTs. The degradation of the pixels leads to a reduction in image quality and lifespan of the OLED display. Thus, the OLED display has adopted a technology for sensing changes in the device characteristics of the pixels and properly modifying input data based on the sensing result to compensate for the degradation of the pixels. The changes in the device characteristics of the pixels include changes in the characteristics of the driving TFT including the threshold voltage, the mobility, etc. of the driving TFT.

The pixels of the OLED display are degraded in proportion to a driving time. For example, a gate bias stress of the driving TFT is greater than a voltage applied to a gate of the driving TFT and increases in proportion to the driving time. The device characteristics of the driving TFT are changed by the gate bias stress. Because the pixels of the OLED display are driven in each frame, stresses of the pixels increase and also a stress deviation between the pixels increases. The changes in the device characteristics of the pixels lead to the degradation of the image quality of the OLED display. In case of an interior display or a public display, because the pixels have to display the same image for a long time, a stress deviation between the pixels further increases. As a result, the image quality is degraded more quickly.

SUMMARY OF THE INVENTION

Embodiments of the invention provide a display device and a method for driving the same capable of improving image quality and lifespan by reducing a stress deviation between pixels.

In one embodiment, a special operation mode processor drives a display panel to display an image. The display panel is configured to operate in a special operation mode. The special operation mode processor determines a pixel block size for blocking the plurality of pixels into a plurality of pixel blocks and determines a first set of on-pixels and an first set of off-pixels. The first set of on-pixels includes at least a first group of pixels comprising at least one pixel in each of the plurality of pixel blocks and the first set of off-pixels includes at least a second group of pixels comprising at least one pixel in each of the plurality of blocks. The first set of on-pixels is turned on and the first set of off-pixels is turned off. A drive history representative value is generated for the first group of pixels. The drive history representative value represents a drive time and drive characteristic for the first group of pixels. The drive history representative value is compared with a threshold value. Responsive to the drive history representative value exceeding the threshold value, a second set of on-pixels and a second set of off-pixels are determined. The second set of on-pixels includes at least the second group of pixels and the second set of off-pixels includes at least the first group of pixels. The second set of on-pixels is turned on and the second set of off-pixels is turned off.

In another embodiment, a non-transitory computer readable storage medium stores instructions executable by a processor that when executed cause the processor to perform the method described above.

In yet another embodiment, a display panel for displaying an image comprises a gate driver, a data driver, and a special operation mode processor. The gate driver supplies scan signals to rows of pixels having one or more on-pixels that are turned on during a special operation mode. The scan signals activate the rows of pixels for displaying data. The data driver supplies data signals to columns of pixels having one or more of the on-pixels that are turned on during the special operation mode. The data signals drive the on-pixels according to pixel data and turn off off-pixels that are turned off during the special operation mode. The special operation mode processor operates when the display panel is configured in the special operation mode. The special operation mode processor determines a pixel block size for blocking the plurality of pixels into a plurality of pixel blocks and determines a first set of on-pixels and a first set of off-pixels. The first set of on-pixels includes at least a first group of pixels comprising at least one pixel in each of the plurality of pixel blocks and the first set of off-pixels includes at least a second group of pixels comprising at least one pixel in each of the plurality of blocks. The special operation mode processor further generates a drive history representative value for the first group of pixels. The drive history representative value represents a drive time and drive characteristic for the first group of pixels. The special operation mode processor compares the drive history representative value with a threshold value. Responsive to the drive history representative value exceeding the threshold value, the special operation mode processor determines a second set of on-pixels including at least the second group of pixels and a second set of off-pixels including at least the first group of pixels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

A display device according to an exemplary embodiment of the invention may be implemented as a flat panel display, such as a liquid crystal display (LCD), a plasma display panel (PDP), an organic light emitting diode (OLED) display, and a field emission display (FED). In the following description, the embodiments of the invention will be described using the OLED display as an example of the flat panel display. Other flat panel displays may be used.

An operation mode according to the embodiment of the invention includes a normal mode and a special mode. In the normal mode, all of pixels are driven in each frame period and display an input image. A driving method in the normal mode is substantially the same as a driving method of a related art display device. The special mode is configured so as to reduce a stress of the pixel and to reduce a stress deviation between the pixels. In the special mode, only some of the pixels are driven in each frame period, and a location of the driven pixel changes based on a driving history.

The operation mode may be selected based on user data input through a user interface or may be automatically changed depending on contents or applied products. For example, the display device according to the embodiment of the invention may operate in the special mode when a still image is input for a long time. Further, when the display device according to the embodiment of the invention is applied to an interior display or a public display, the display device may operate in the special mode.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
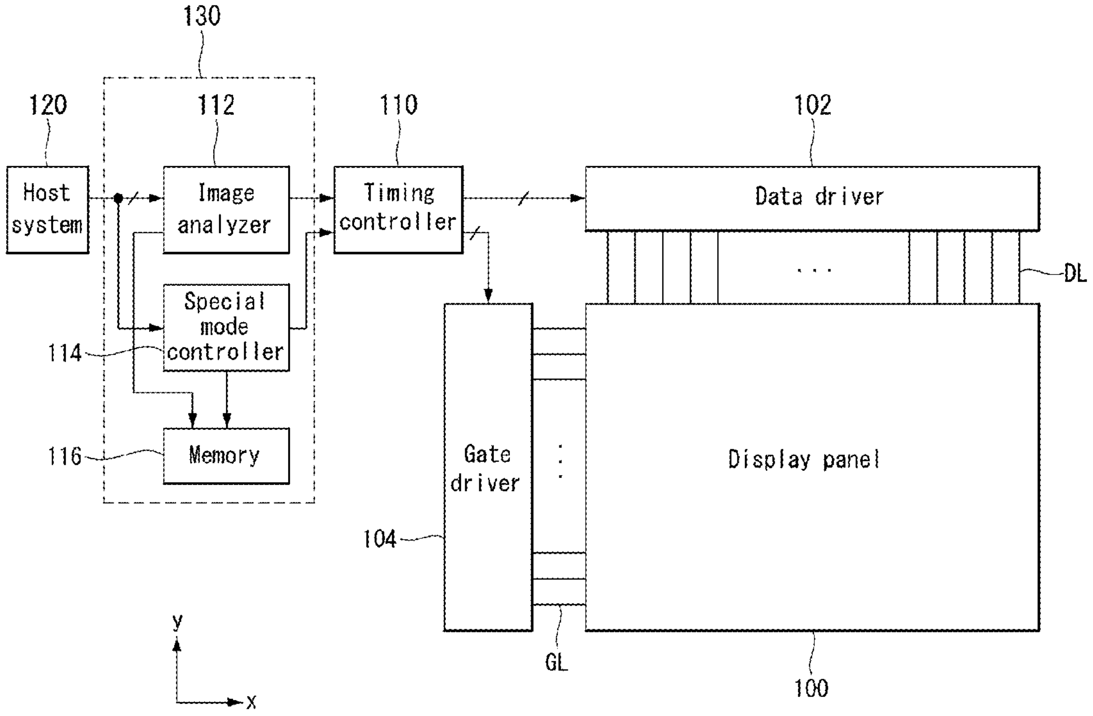
FIG. 1 is a block diagram of an organic light emitting diode display according to an exemplary embodiment of the invention.
Figure 2:
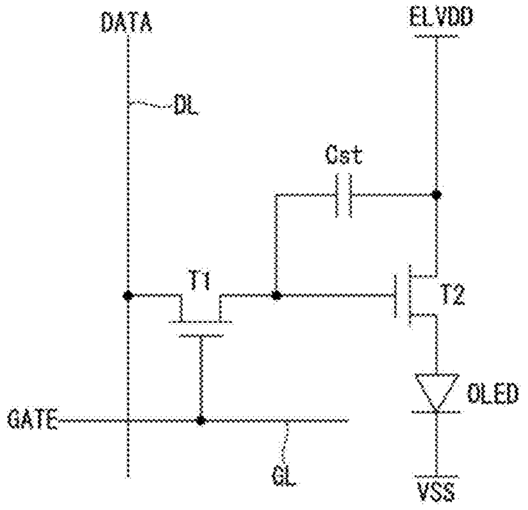
FIG. 2 is an equivalent circuit diagram of a pixel.
Figure 3:
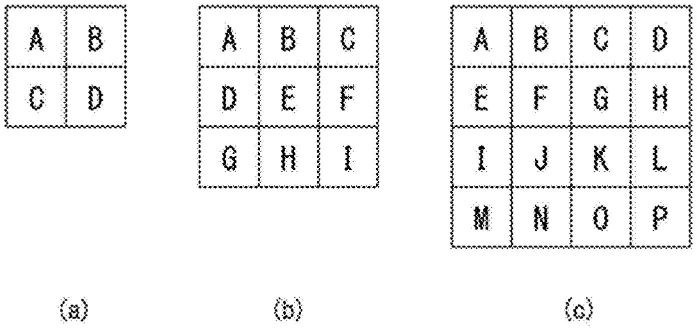
FIG. 3 shows various examples of a block size.

Referring to FIGS. 1 to 3, an organic light emitting diode (OLED) display according to an exemplary embodiment of the invention includes a display panel 100, a special mode processing unit 130, and a display panel driving circuit.

A pixel array of the display panel 100 displays data of an input image. The pixel array of the display panel 100 includes a plurality of data lines DL, a plurality of scan (or gate) lines GL crossing the data lines DL, and pixels arranged in a matrix form. Each pixel may include a red subpixel, a green subpixel, and a blue subpixel for the color representation. Each pixel may further include a white subpixel. The display panel 100 may include a red color filter, a green color filter, and a blue color filter.

As shown in FIG. 2, each pixel may include a plurality of thin film transistors (TFTs) T1 and T2, a storage capacitor Cst, and an organic light emitting diode (OLED), but is not limited thereto.

The OLED may be configured as an organic compound layer including a hole injection layer HIL, a hole transport layer HTL, an emission layer EML, an electron transport layer ETL, an electron injection layer EIL, etc., which are stacked. An anode of the OLED is connected to a source of the second TFT T2, and a cathode of the OLED is connected to a ground level voltage source GND.

The first TFT T1 applies a data signal input through the data line DL to a gate of the second TFT T2 in response to a scan signal from the scan line GL. A gate of the first TFT T1 is connected to the scan line GL. A drain of the first TFT T1 is connected to the data line DL, and a source of the first TFT T1 is connected to the gate of the second TFT T2.

The second TFT T2 operates as a driving TFT and adjusts a current flowing in the OLED depending on a gate voltage. A high potential power voltage ELVDD is applied to a drain of the second TFT T2. The source of the second TFT T2 is connected to the anode of the OLED. The storage capacitor Cst holds a gate voltage of the second TFT T2.

A sensing circuit for sensing characteristics of the driving TFT and an internal compensation circuit for compensating for changes in the characteristics of the driving TFT may be added to the pixels. The sensing circuit and the internal compensation circuit may use any known circuit. Device characteristics of the pixel include changes in the characteristics of the driving TFT, for example, a change amount Δ ch of a threshold voltage of the driving TFT, a change amount Δμ of a mobility of the driving TFT, etc. Changes in the device characteristics of the pixel may be converted into digital data through an analog-to-digital converter (ADC) of the sensing circuit and may be transmitted to a timing controller 110. The ADC may be embedded in a data driver 102.

The special mode processing unit 130 (e.g., a general purpose or image processor) virtually divides the pixel array into a plurality of blocks in a special mode and drives only some of pixels belonging to each block. The size of the block may be fixed to a previously set size under the control of the special mode processing unit 130. The size of the block may be changed depending on the result of an analysis of the input image. The size of each block may be equal to or greater than the pixel size of a 2 e matrix and may be changed depending on the result of an analysis of the input image. In the following description, a driven pixel of the block is referred to as an "ON-pixel", and a non-driven pixel of the block is referred to as an "OFF-pixel".

The special mode processing unit 130 updates a drive history or a drive history representative value of each pixel in each frame period and stores it in a memory 116. When a stress of the ON-pixel is equal to or greater than a predetermined level, the special mode processing unit 130 changes a location of the ON-pixel based on the drive history or the drive history representative value. When the pixel array is dividedly driven on a per block basis in the special mode, only some of pixels belonging to each block are driven as the ON-pixels. Therefore, stresses of the pixels may decrease, and also a stress deviation between the pixels may decrease.

The special mode processing unit 130 may change a location of the ON-pixel on a per group basis. Each group includes only the ON-pixels selected from each block. For example, the special mode processing unit 130 drives pixels of a first group. After a predetermined period of time passed, when a drive history representative value of the first group increases to a value equal to or greater than a previously set threshold value, the special mode processing unit 130 may convert the pixels of the first group into the OFF-pixels and may drive pixels of a second group. A location of the ON-pixel in each block may be changed depending on the drive history of the pixel.

The drive history indicates information on a drive history of each pixel. The drive history includes information on a driving time of the pixel. In addition, the drive history may include a gray level of the pixel, a weight value of the pixel at each gray level, and information on changes in the device characteristics obtained from the sensing circuit. The drive history is updated in each frame period and may be stored in the memory 116. The drive history representative value indicates a representative value of the drive histories of the pixels and may include one or one or more of a representative value, a maximum value, a minimum value, and a mode value of the drive histories of the pixels. The drive history representative value is calculated using a block representative value of the blocks and a group representative value of the groups each including only the ON-pixels and may be stored in the memory 116. The drive history representative value may be calculated using only the group representative value and may be stored in the memory 116, so as to reduce a capacity of the memory 116. The drive history representative value may be updated in each frame period.

The special mode processing unit 130 may be enabled only in the special mode. The special mode processing unit 130 transmits a location of the ON-pixel to the timing controller 110 in each frame period. The special mode processing unit 130 may be embedded in a host system 120 or the timing controller 110.

The special mode processing unit 130 includes an image analyzer 112, a special mode controller 114, and the memory 116. In an embodiment, one or more components of the special mode processing unit such as the image analyzer 121 and the special mode controller 114 are embodied as a non-transitory computer readable storage medium that stores instructions that when executed by a processor cause the special mode processing unit 130 to carry out the processes and functions attributed to the respective components as discussed herein.

The image analyzer 112 analyzes data of the input image received from the host system 120 and analyzes one or more of a resolution, brightness, a contrast ratio, gray-level distribution, complexity, and a motion of the input image in each frame period. An image analysis method may use any known method, for example, a histogram analysis method, an average luminance calculation method, an analysis method using an edge filter, a motion vector analysis method, etc. The image analyzer 112 may separate an object and a background from the input image using an object extraction algorithm.

In general, a display device includes an image analysis module embedded in the timing controller 110 and analyzing an input image, so as to improve image quality. Thus, the embodiment of the invention may use the image analyzer 112 as the existing image analysis module without adding a new component. The image analyzer 112 may be embedded in the timing controller 110.

The special mode controller 114 stores the drive history and/or the drive history representative value in the memory 116 and updates it in each frame period. In the special mode, the special mode controller 114 selects the ON-pixel from each block, compares the drive history representative value with the predetermined threshold value, and changes a location of the ON-pixel in each block when the drive history representative value is greater than the threshold value. The location of the ON-pixel in each block may be changed on a per group basis.

The host system 120 may be implemented as one of a television system, a set-top box, a navigation system, a DVD player, a Blu-ray player, a personal computer (PC), a home theater system, and a phone system.

The display panel driving circuit includes the data driver 102, a gate driver 104, and the timing controller 110.

The display panel driving circuit writes the data of the input image on the pixel array of the display panel 100. The display panel driving circuit senses changes in the device characteristics of the pixel and modulates the data of the input image based on the changes in the device characteristics of the pixel, thereby compensating for the changes in the device characteristics of the pixel.

The data driver 102 includes at least one source driver integrated circuit (IC). Each source driver IC may include an ADC converting sensing data into digital data and a digital-to-analog converter (DAC) converting digital video data of the input image into the data signal. The data driver 102 converts the digital video data of the input image received from the timing controller 110 into an analog gamma compensation voltage using the DAC and generates the data signal. The data driver 102 outputs the data signal to the data lines DL. Each pixel data includes red data, green data, and blue data. Each pixel data may further include white data. The data driver 102 transmits a sensing value received through the ADC to the timing controller 110.

The gate driver 104 supplies a scan signal (or a gate signal) synchronized with the data signal to the scan lines GL under the control of the timing controller 110.

The timing controller 110 receives the pixel data of the input image and timing signals from the host system 120. The timing controller 110 generates timing control signals for controlling operation timings of the data driver 102 and the gate driver 104 based on the timing signals Vsync, Hsync, DE, and DCLK received along with the pixel data of the input image.

The timing controller 110 may execute an image quality compensation algorithm calculating a compensation value based on the sensing value received through the ADC. The image quality compensation algorithm may use any known algorithm compensating for changes in the device characteristics of the OLED display. The image quality compensation algorithm obtains sensing values from pixels of a sensing location, calculates changes in device characteristics of remaining pixels using the sensing values, and estimates changes in the device characteristics of the remaining pixels. The image quality compensation algorithm stores the sensing value received through the ADC in the memory 116, selects a compensation value previously set based on the sensing value, and modulates the data of the input image using the compensation value. The compensation value may be added to or subtracted from the data of the input image to produce an offset value compensating for the threshold voltage of the driving TFT. Further, the compensation value may be multiplied by the pixel data to produce a gain value compensating for the mobility of the driving TFT. The timing controller 110 transmits the pixel data modulated by the image quality compensation algorithm to the data driver 102. As described above, the embodiment of the invention compensates for the changes in the device characteristics of the pixels and thus can increase the lifespan of the OLED display.

The timing controller 110 controls the data driver 102 and the gate driver 104, so that all of channels of the data driver 102 and the gate driver 104 are driven in the normal mode. Thus, data of the input image is written on all of the pixels in the normal mode.

The timing controller 110 controls the data driver 102 and the gate driver 104, so that only the channels connected to the ON-pixels among the channels of the data driver 102 and the gate driver 104 are driven in the special mode. Thus, the channels of the drivers 102 and 104 connected to the OFF-pixels are floated in the special mode and are separated from the data lines DL and the scan lines GL. Because current does not flow in the floated channels, power consumption is scarcely generated.

FIG. 3 shows various examples of the block size.

Referring to FIG. 3, the size of the block may be variously set in the special mode. In FIG. 3, (a) shows a block having the pixel size of a 2th matrix; (b) shows a block having the pixel size of a 3he matrix; and (c) shows a block having the pixel size of a 4×4 matrix. An identification (ID) for designating the On-pixel may be given to each of the pixels belonging to each block. In FIG. 3, A to P are examples of the ID. The same ID is given to the pixel of the same location in each block. For example, a first group of pixels corresponding to ON-pixels are positioned at corresponding first pixel locations within each of the plurality of pixel blocks and other groups of pixels corresponding to OFF-pixels are each positioned at corresponding pixel locations within the plurality of blocks. The special mode processing unit 130 may select the ON-pixels from each block based on the ID. The number of ON-pixels in one block may be equal to or greater than one and may be less than a total number of pixels belonging to the one block.

Figure 4:
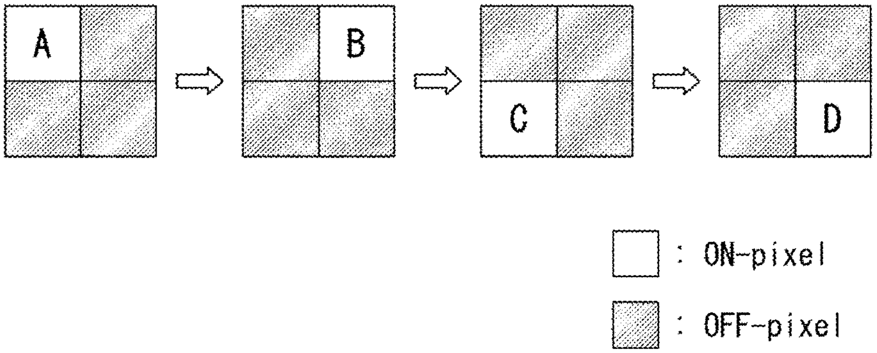
FIG. 4 shows an example of changes in a location of an ON-pixel in a block.

FIG. 4 shows an example of changes in a location of the ON-pixel in the block.

Referring to FIG. 4, the special mode processing unit 130 may change a location of the ON-pixel at a time interval previously set in each block or when the drive history is greater than the predetermined threshold value. For example, a location of the ON-pixel in one block may be changed in order of A, B, C and D on a time axis.

Figure 5:
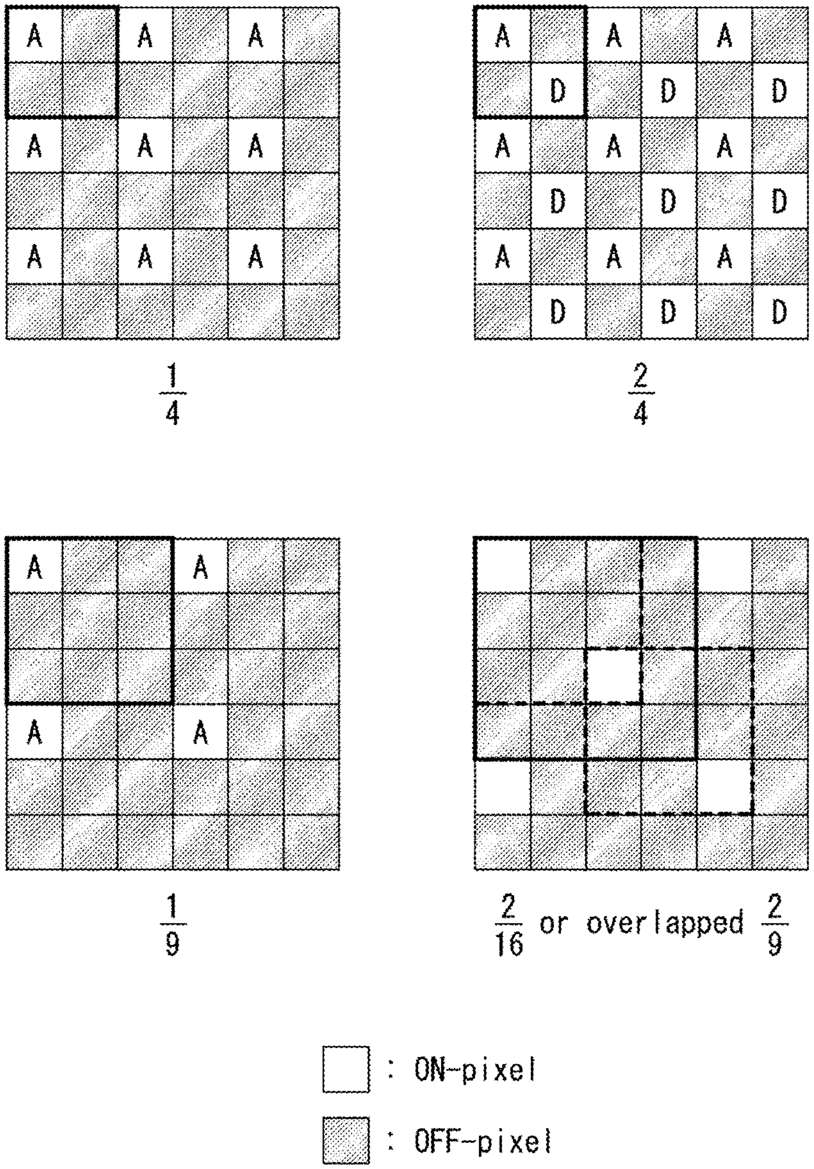
FIG. 5 shows various ratios of an ON-pixel in a block.

FIG. 5 shows various ratios of the ON-pixel in the block.

Referring to FIG. 5, the special mode processing unit 130 may change the block size and the number of ON-pixels of each block depending on the result of an analysis of the input image or the drive history. For example, the special mode processing unit 130 may drive one pixel among a total of four pixels belonging to a 2 o block to select a ratio of ON-pixels in the 2n block as 1/4 and also may drive two pixels among the total of four pixels of the 2ri block to select a ratio of ON-pixels in the 2f block as 2/4 (=1/2). Further, the special mode processing unit 130 may drive one pixel among a total of nine pixels belonging to a 3×3 block to select a ratio of ON-pixels in the 3×3 block as 1/9. Further, the special mode processing unit 130 may drive one pixel among a total of sixteen pixels belonging to a 4×4 block to select a ratio of ON-pixels in the 4×4 block as 1/16. Further, the special mode processing unit 130 may drive two pixels among a total of sixteen pixels belonging to a 4×4 block to select a ratio of ON-pixels in the 4×4 block as 2/16(=1/8) or as overlapped 2/9.

Figure 6:
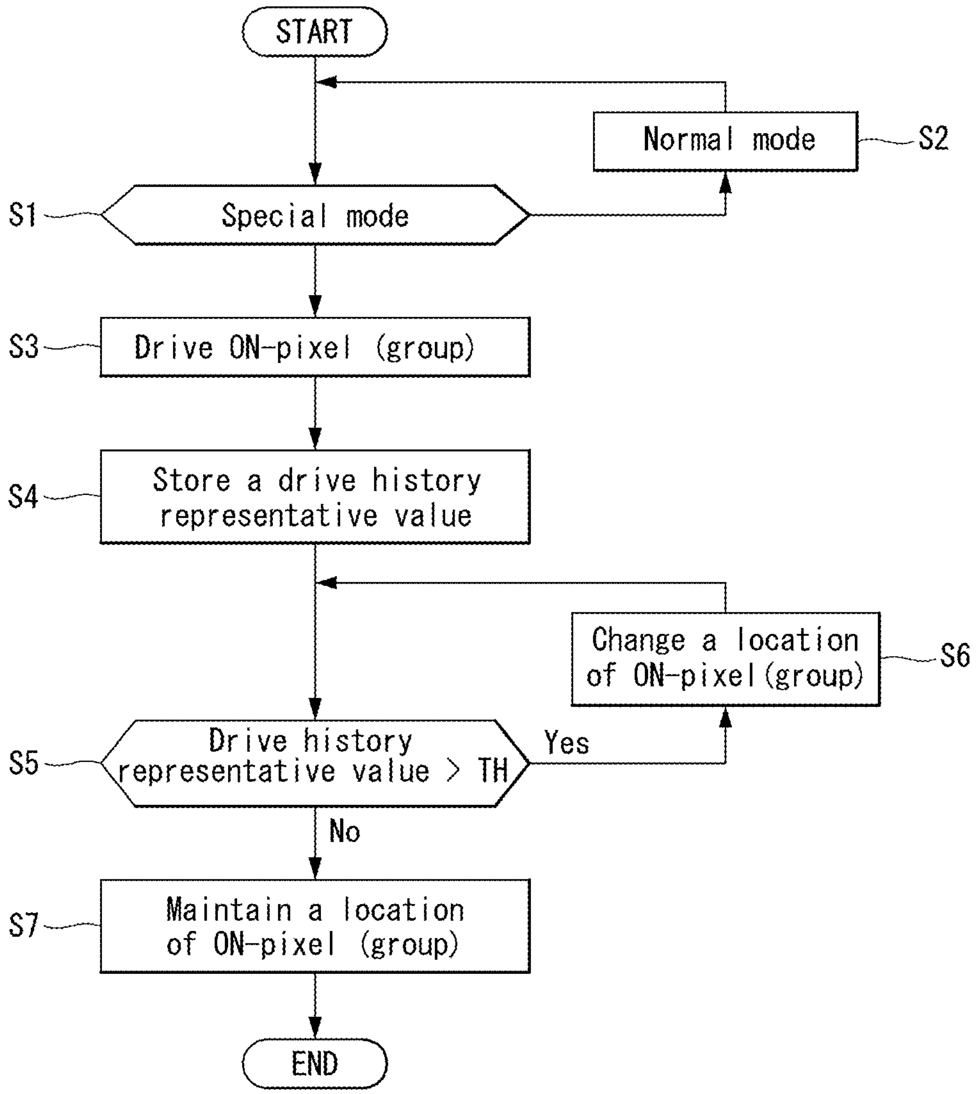
FIG. 6 is a flow chart showing a method for driving a display device according to an exemplary embodiment of the invention.

FIG. 6 illustrates a method for driving the display device according to the embodiment of the invention.

Referring to FIG. 6, the special mode processing unit 130 determines a pixel block size for blocking the plurality of pixels in the image into a plurality of pixel blocks and determines a first set of ON-pixels and a first set of OFF-pixels in the block in steps S1 to S3. The special mode processing unit 130 may select a location of the ON-pixel on a per group basis. For example, in one embodiment, the first set of on-pixels includes at least a first group of pixels comprising at least one pixel in each of the plurality of pixel blocks and the first set of off-pixels includes at least a second group of pixels comprising at least one pixel in each of the plurality of blocks. The ON-pixel of each group may be identified by the ID given to each pixel. Thus, one ON-pixel group includes ON-pixels existing at the same location in each block. In step s3, the first set of ON-pixels are turned on and the first set of OFF-pixels are turned off.

The special mode processing unit 130 generates and stores a drive history and/or a drive history representative value for the first set group of pixels (e.g., representing a drive time and drive characteristic) in the memory 116 and updates it in each frame period in step S4. The special mode processing unit 130 compares the drive history representative value of the pixels with the predetermined threshold value and changes a location of the ON-pixel (group) when the drive history representative value is greater than the threshold value in steps S5 and S6. For example, the special mode processing unit 130 determines a second set of ON-pixels and a second set of OFF-pixels in which the second set of on pixels includes at least the second group of pixels and the second set of OFF-pixels includes at least the second group of pixels. The second set of ON-pixels are turned on and the second set of OFF-pixels are turned off. When the drive history representative value is equal to or less than the threshold value, the special mode processing unit 130 maintains a location of the ON-pixel in step S7.

Figure 7:
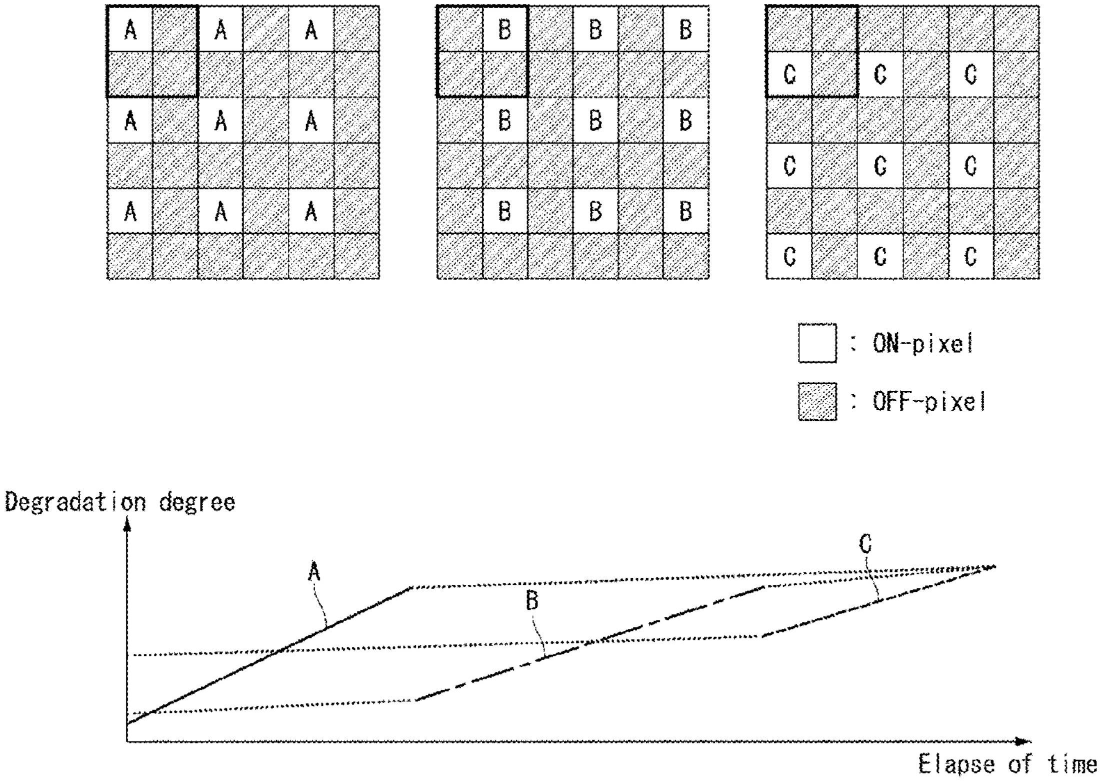
FIG. 7 illustrates an effect of a reduction in a stress of pixels in a special mode.

FIG. 7 illustrates an effect of a reduction in a stress of pixels in the special mode.

Referring to FIG. 7, the special mode processing unit 130 drives a first ON-pixel group of each block. When a drive history representative value of the first ON-pixel group is greater than the predetermined threshold value, the special mode processing unit 130 converts pixels of the first ON-pixel group into OFF-pixels and drives a second ON-pixel group. The first ON-pixel group includes ON-pixels A of the same location in each block, and the second ON-pixel group includes ON-pixels B of the same location in each block. A pixel location of the first ON-pixel group is set to be different from a pixel location of the second ON-pixel group.

When a drive history representative value of the second ON-pixel group is greater than the threshold value, the special mode processing unit 130 converts pixels of the second ON-pixel group into OFF-pixels and drives a third ON-pixel group. According to the embodiment of the invention, when a stress of the ON-pixels excessively increases, a location of the ON-pixels is changed. Therefore, the stress of the ON-pixels may be controlled below a previously set threshold value. Hence, lifespan of the display device may increase, and the degradation of image quality may become slow. When the ON-pixels are converted into the OFF-pixels, the ON-pixels may reduce the stress and may be recovered during an OFF period.

Figure 8:
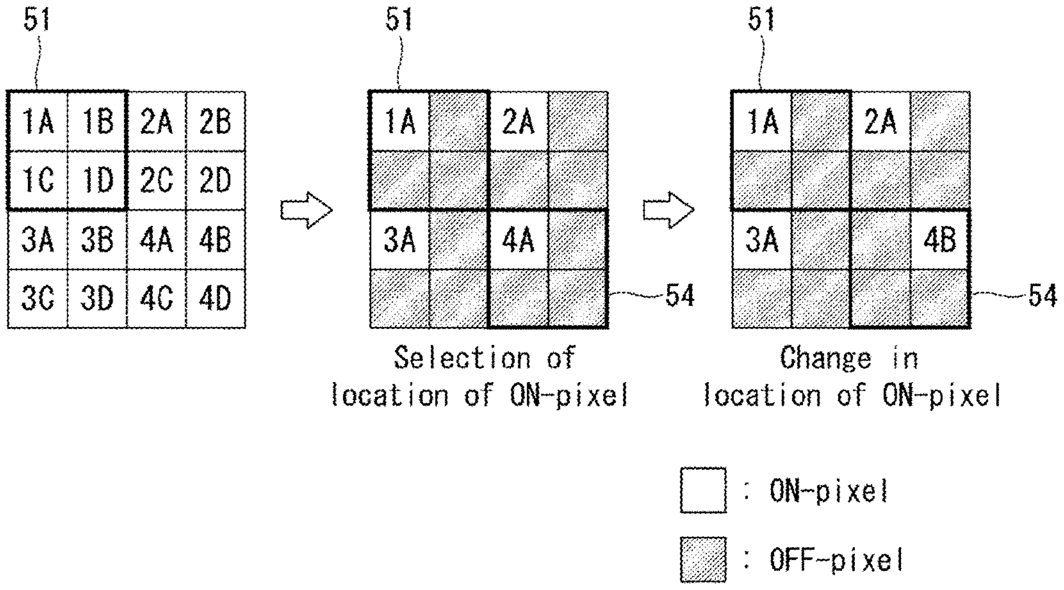
FIGS. 8 and 9 show an example where a location of an ON-pixel is changed depending on a drive history.
Figure 9:
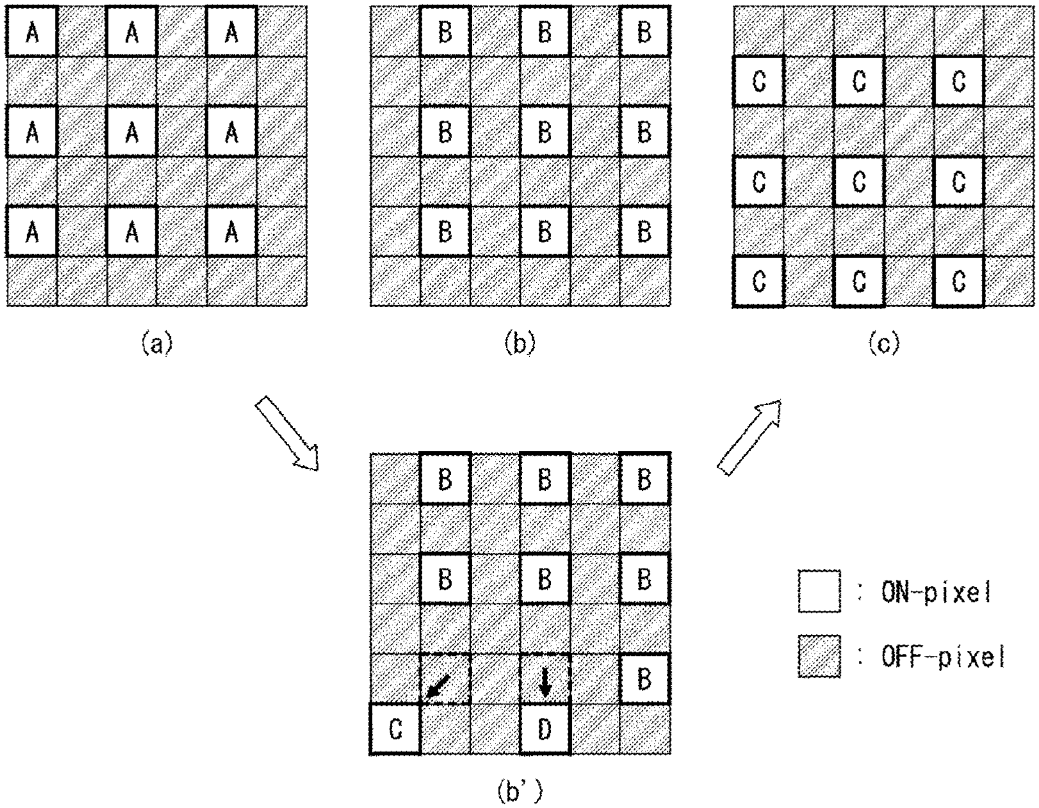

FIGS. 8 and 9 show an example where a location of the ON-pixel is changed depending on a drive history.

Referring to FIGS. 8 and 9, the special mode processing unit 130 does not fix a location of an ON-pixel in each group and may change the location of the ON-pixel in blocks 51 and 54 depending on a drive history. For example, as shown in FIG. 8, when a drive history of a pixel 4A in a fourth block 54 is greater than a predetermined threshold value, the embodiment of the invention controls the pixel 4A as an OFF-pixel and controls a pixel 4B as an ON-pixel. As shown in (b') of FIG. 9, when a drive history of a pixel B is greater than the predetermined threshold value, the embodiment of the invention controls the pixel B as an OFF-pixel and controls a pixel C or a pixel D as an ON-pixel.

Figure 10:
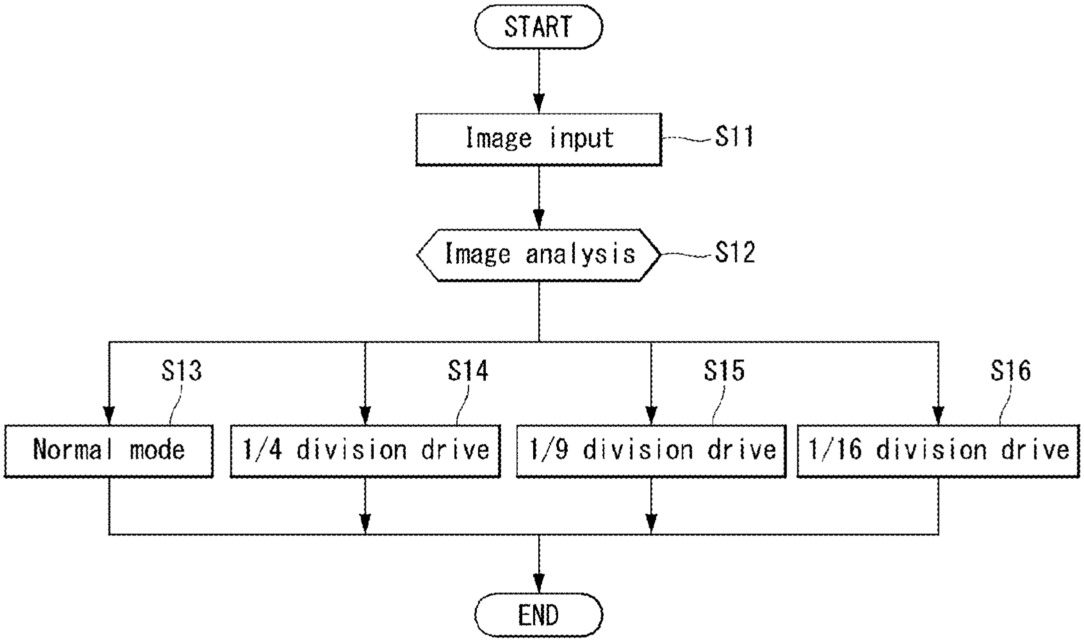
FIG. 10 illustrates a method for automatically adjusting the size and an ON-pixel ratio of a block according to an exemplary embodiment of the invention.
Figure 11:
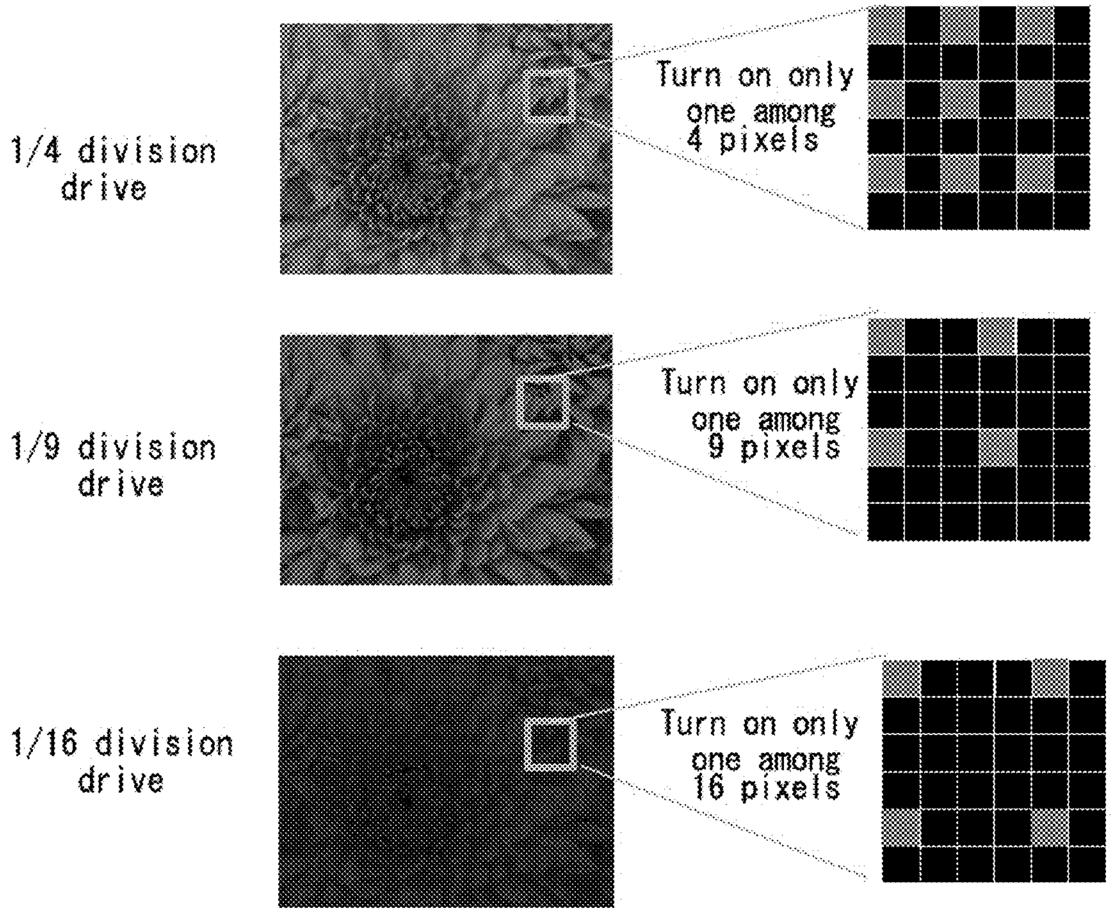
FIG. 11 shows changes in the size and an ON-pixel ratio of a block depending on the result of an analysis of an input image.

The special mode processing unit 130 may select the block size depending on a selection of a user. As shown in FIGS. 10 and 11, the special mode processing unit 130 may automatically adjust the size and an ON-pixel ratio of each block based on the result of an analysis of the input image in the special mode in steps S11 to S16.

The special mode processing unit 130 may determine a resolution of the input image. In case of an image of a high resolution (e.g., having a resolution above a resolution threshold), the special mode processing unit 130 determines the pixel block size, the ON-pixels, and the OFF-pixels to meet a first ON-pixel ratio representing a ratio of a total number of ON-pixels to a total number of pixels in the image. For example, as the resolution increases, the special mode processing unit 130 reduces the block size or increases the ON-pixel ratio in each block. Alternatively, in the image of the high resolution, the block size may decrease, and at the same time, the ON-pixel ratio in each block may increase. In case of an image of a low resolution (e.g., having a resolution below a resolution threshold), the special mode processing unit 130 determines the pixel block size, the ON-pixels, and the OFF-pixels to meet a second ON-pixel ratio lower than the first ON-pixel ratio. For example, as the resolution decreases, the special mode processing unit 130 increases the block size or reduces the ON-pixel ratio in each block. Alternatively, in the image of the low resolution, the block size may increase, and at the same time, the ON-pixel ratio in each block may decrease. In the display device according to the embodiment of the invention, when the resolution of the input image changes, the block size and/or the ON-pixel ratio in each block are/is changed. Accordingly, the embodiment of the invention may control the stress of each pixel below a predetermined level within the range where the user cannot perceive a reduction in the image quality of the display device.

The special mode processing unit 130 may decide an average luminance of the input image. The average luminance may be calculated by an average picture level (APL). In case of a bright image having a high average luminance (e.g., having a luminance above a luminance threshold), the special mode processing unit 130 determines the pixel block size, the ON-pixels, and the OFF-pixels to meet a first ON-pixel ratio representing a ratio of a total number of ON-pixels to a total number of pixels in the image. For example, as the luminance increases, the special mode processing unit 130 reduces the block size or increases the ON-pixel ratio in each block. Alternatively, in the bright image, the block size may decrease, and at the same time, the ON-pixel ratio in each block may increase. In case of a dark image having a low average luminance (e.g., having a luminance below a luminance threshold), the special mode processing unit 130 determines the pixel block size, the ON-pixels, and the OFF-pixels to meet a second ON-pixel ratio lower than the first ON-pixel ratio. For example, as the luminance decreases, the special mode processing unit 130 increases the block size or reduces the ON-pixel ratio in each block. Alternatively, in the dark image, the block size may increase, and at the same time, the ON-pixel ratio may decrease in each block. In the display device according to the embodiment of the invention, when the average luminance of the input image changes, the block size and/or the ON-pixel ratio in each block are/is changed. Accordingly, the embodiment of the invention may control the stress of each pixel below the predetermined level within the range where the user cannot perceive a reduction in the image quality of the display device.

The special mode processing unit 130 may decide a motion of the input image. A motion and a speed of the input image may be calculated through a method for calculating a motion vector or a method for comparing pixel data of frames. In case of a motion picture having sufficiently high motion, (e.g., having a motion metric above a motion threshold), the special mode processing unit 130 determines the pixel block size, the ON-pixels, and the OFF-pixels to meet a first ON-pixel ratio representing a ratio of a total number of ON-pixels to a total number of pixels in the image. For example, as the motion increases, the special mode processing unit 130 reduces the block size or increases the ON-pixel ratio in each block. Alternatively, in the high motion picture, the block size may decrease, and at the same time, the ON-pixel ratio in each block may increase. As a motion speed of the motion picture increases, the block size may further decrease, and the ON-pixel ratio in each block may further increase. In case of a still image or a video with low motion (e.g., having a motion metric below a motion threshold), the special mode processing unit 130 determines the pixel block size, the ON-pixels, and the OFF-pixels to meet a second ON-pixel ratio lower than the first ON-pixel ratio. For example, as the motion decreases, the special mode processing unit 130 increases the block size or reduces the ON-pixel ratio in each block. Alternatively, in the still image, the block size may increase, and at the same time, the ON-pixel ratio in each block may decrease. In the display device according to the embodiment of the invention, when the input image changes from the motion picture to the still image and vice versa, the block size and/or the ON-pixel ratio in each block are/is changed. Accordingly, the embodiment of the invention may control the stress of each pixel below the predetermined level within the range where the user cannot perceive a reduction in the image quality of the display device.

Figure 12:
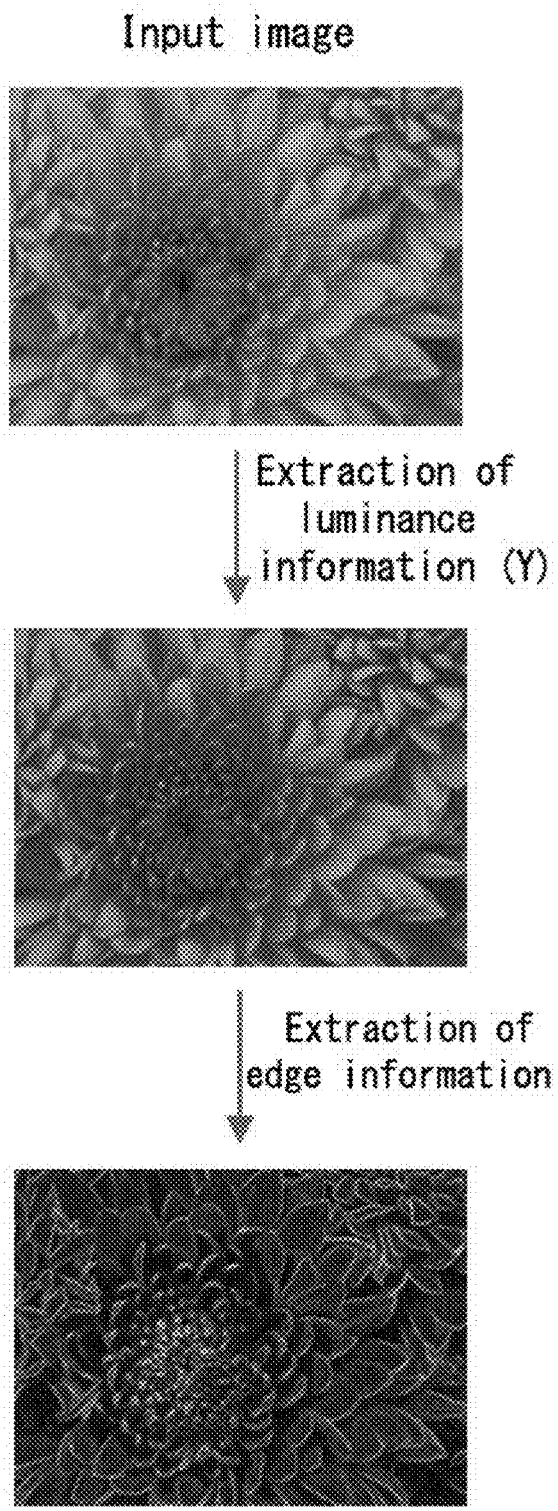
FIG. 12 shows an example of a method for detecting edges of an input image.

As shown in FIG. 12, the special mode processing unit 130 may input data of an image corresponding to one frame to an edge filter and may calculate the number and distribution of edges included in the image, thereby estimating the complexity of the image. In general, a complex image includes a large number of edges, and a simple image includes a relatively small number of edges. In the complex image, (e.g., having a complexity above a complexity threshold), the special mode processing unit 130 determines the pixel block size, the ON-pixels, and the OFF-pixels to meet a first ON-pixel ratio representing a ratio of a total number of ON-pixels to a total number of pixels in the image. For example, as the complexity increases, the special mode processing unit 130 reduces the block size or increases the ON-pixel ratio in each block. Alternatively, in the complex image, the block size may decrease, and at the same time, the ON-pixel ratio in each block may increase. In the simple image, (e.g., having a complexity below a complexity threshold), the special mode processing unit 130 determines the pixel block size, the ON-pixels, and the OFF-pixels to meet a second ON-pixel ratio lower than the first ON-pixel ratio. For example, as the complexity decreases, the special mode processing unit 130 increases the block size or reduces the ON-pixel ratio in each block. Alternatively, in the simple image, the block size may increase, and at the same time, the ON-pixel ratio in each block may decrease. Accordingly, the embodiment of the invention may control the stress of each pixel below the predetermined level within the range where the user cannot perceive a reduction in the image quality of the display device.

Figure 13:
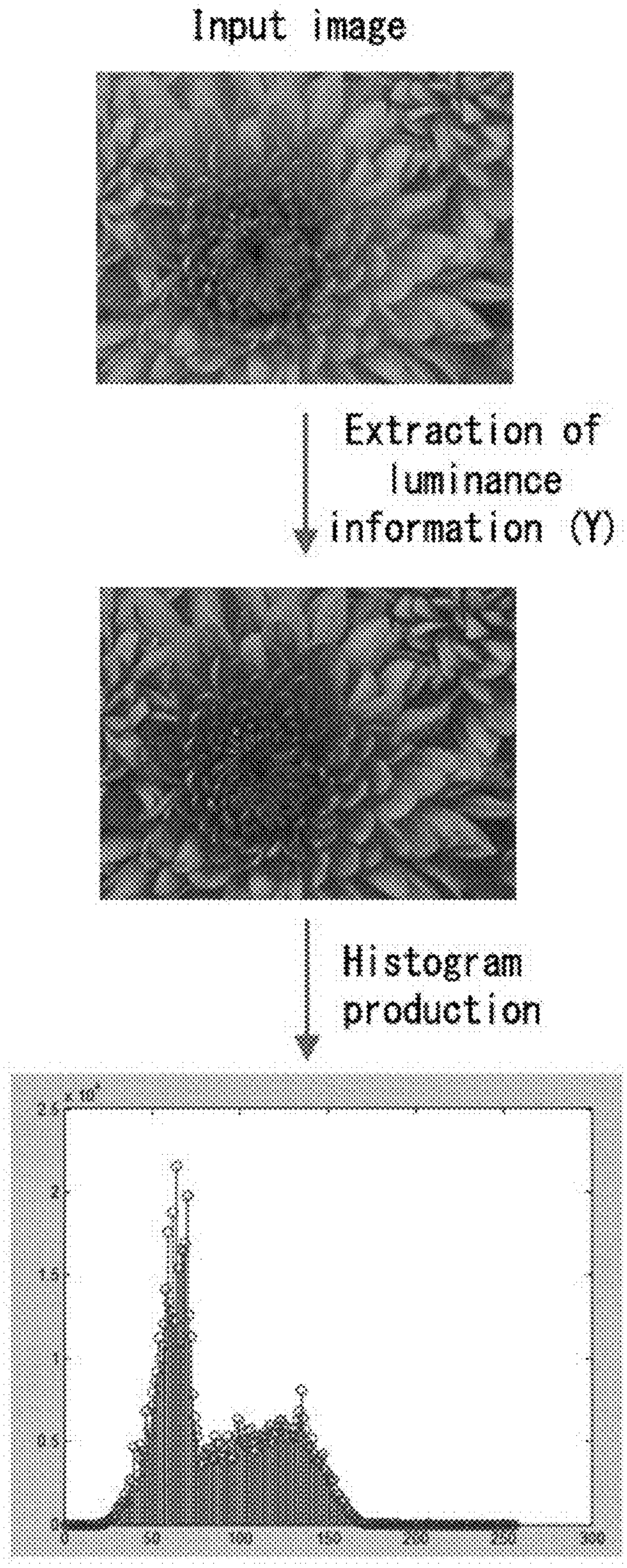
FIG. 13 shows an example of a method for detecting a distribution of gray levels of an input image.
Figure 14:
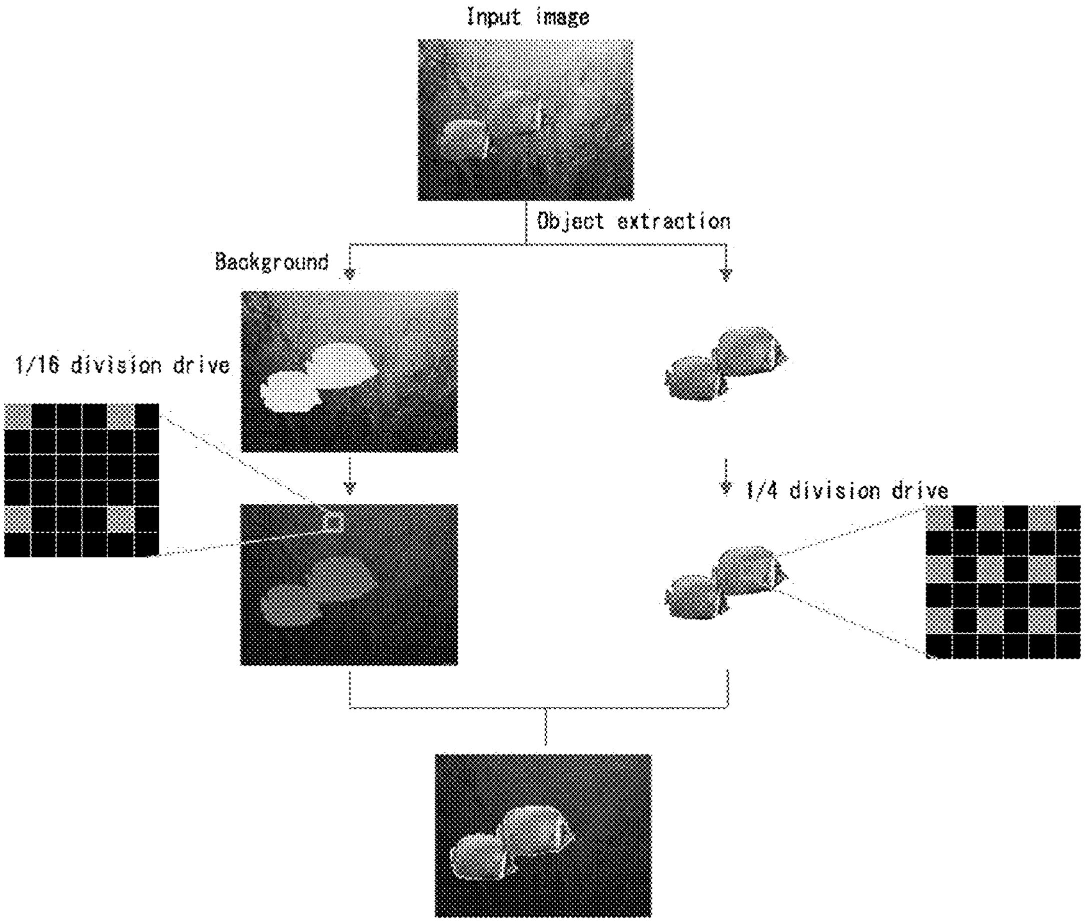
FIG. 14 shows an example of an extraction of an object from an input image.

As shown in FIG. 13, the special mode processing unit 130 may decide a distribution of gray levels of an image corresponding to one frame and may change the block size and/or the ON-pixel ratio in each block depending on the gray-level distribution. As shown in FIG. 13, the gray-level distribution may be calculated through a cumulative histogram of the number of pixels at each gray level. In the histogram of FIG. 13, x-axis is the gray level, and y-axis is the number of pixels. In case of an image having a relatively large number of high gray levels, (e.g., having a gray level distribution above a gray level distribution threshold), the special mode processing unit 130 determines the pixel block size, the ON-pixels, and the OFF-pixels to meet a first ON-pixel ratio representing a ratio of a total number of ON-pixels to a total number of pixels in the image. For example, with a high gray level distribution, the special mode processing unit 130 decides the image as a bright image. In this instance, the special mode processing unit 130 reduces the block size or increases the ON-pixel ratio in each block. Alternatively, in the image of the high gray levels, the block size may decrease, and at the same time, the ON-pixel ratio in each block may increase. In case of an image having a relatively large number of low gray levels (e.g., having a gray level distribution below a gray level distribution threshold), the special mode processing unit 130 determines the pixel block size, the ON-pixels, and the OFF-pixels to meet a second ON-pixel ratio representing a ratio lower than the first ON-pixel ratio. For example, with a low gray level distribution, the special mode processing unit 130 decides the image as a dark image. In this instance, the special mode processing unit 130 increases the block size or reduces the ON-pixel ratio in each block. Alternatively, in the image of the low gray levels, the block size may increase, and at the same time, the ON-pixel ratio in each block may decrease. Accordingly, the embodiment of the invention may control the stress of each pixel below the predetermined level within the range where the user cannot perceive a reduction in the image quality of the display device.

As shown in FIG. 13, the special mode processing unit 130 separates foreground pixels representing a foreground object and background pixels representing a background scene from the input image using an object extraction algorithm and may cause a block size and/or an ON-pixel ratio in the foreground object to be different from a block size and/or an ON-pixel ratio in the background. For example, the special processing unit 130 determines for the foreground pixels, a foreground block size, a foreground set of ON-pixels, and a foreground set of OFF-pixels to meet a foreground ON-pixel ratio and determines for the background pixels, a background block size, a background set of ON-pixels, and a background set of OFF-pixels to meet a background ON-pixel ratio lower than the foreground ON-pixel ratio. In other words, in the foreground pixels representing the foreground object of the input image, the special mode processing unit 130 reduces the block size or increases the ON-pixel ratio in each block relative to the background pixels. Alternatively, for the foreground pixels representing the foreground object of the input image, the block size may decrease relative to the background pixels, and at the same time, the ON-pixel ratio in each block may increase relative to the background pixels. Similarly, in the background pixels of the input image, the special mode processing unit 130 increases the block size or reduces the ON-pixel ratio in each block relative to the foreground pixels. Alternatively, in the background pixels of the input image, the block size may increase relative to the foreground pixels, and at the same time, the ON-pixel ratio in each block may decrease relative to the foreground pixels. Accordingly, the embodiment of the invention may control the stress of each pixel below the predetermined level within the range where the user cannot perceive a reduction in the image quality of the display device.

The embodiment of the invention may compare each of the above-described analysis indexes of the image with one or more threshold values and may determine the block size and the ON-pixel ratio. The one or more threshold values are different from the threshold value compared with the drive history.

If the display device is dividedly driven on a per block basis, only some of the pixels may be driven. Hence, the stress of the pixels may decrease, and power consumption of the display panel 100 may decrease. Further, power consumption of the display panel driving circuits 102, 104, and 110 may decrease. However, the number of transitions of the data signal increases in an output channel of the data driver 102 connected to the ON-pixel. Each time the data signal is transitioned, current flows in a channel related to the data driver 102 and generates power consumption. A method capable of further improving the power consumption of the display panel driving circuits 102, 104, and 110 is described below.

Figure 15:
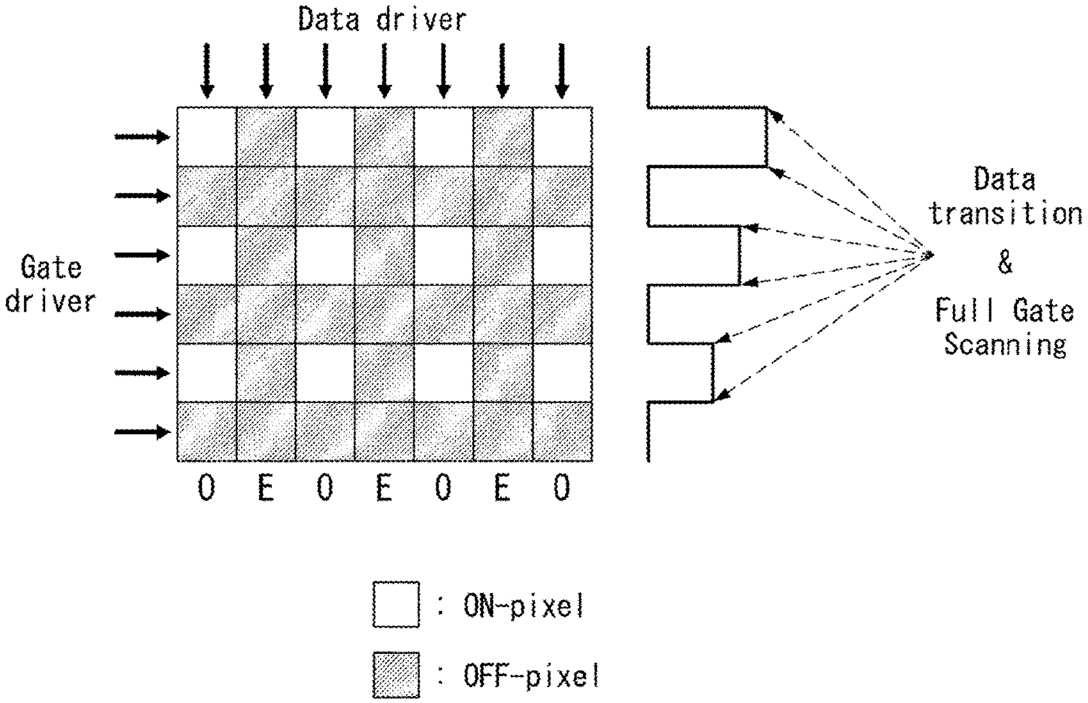
FIGS. 15 and 16 show an example where the number of transitions of the data signal increases when a distance between ON-pixels of blocks decreases.
Figure 16:
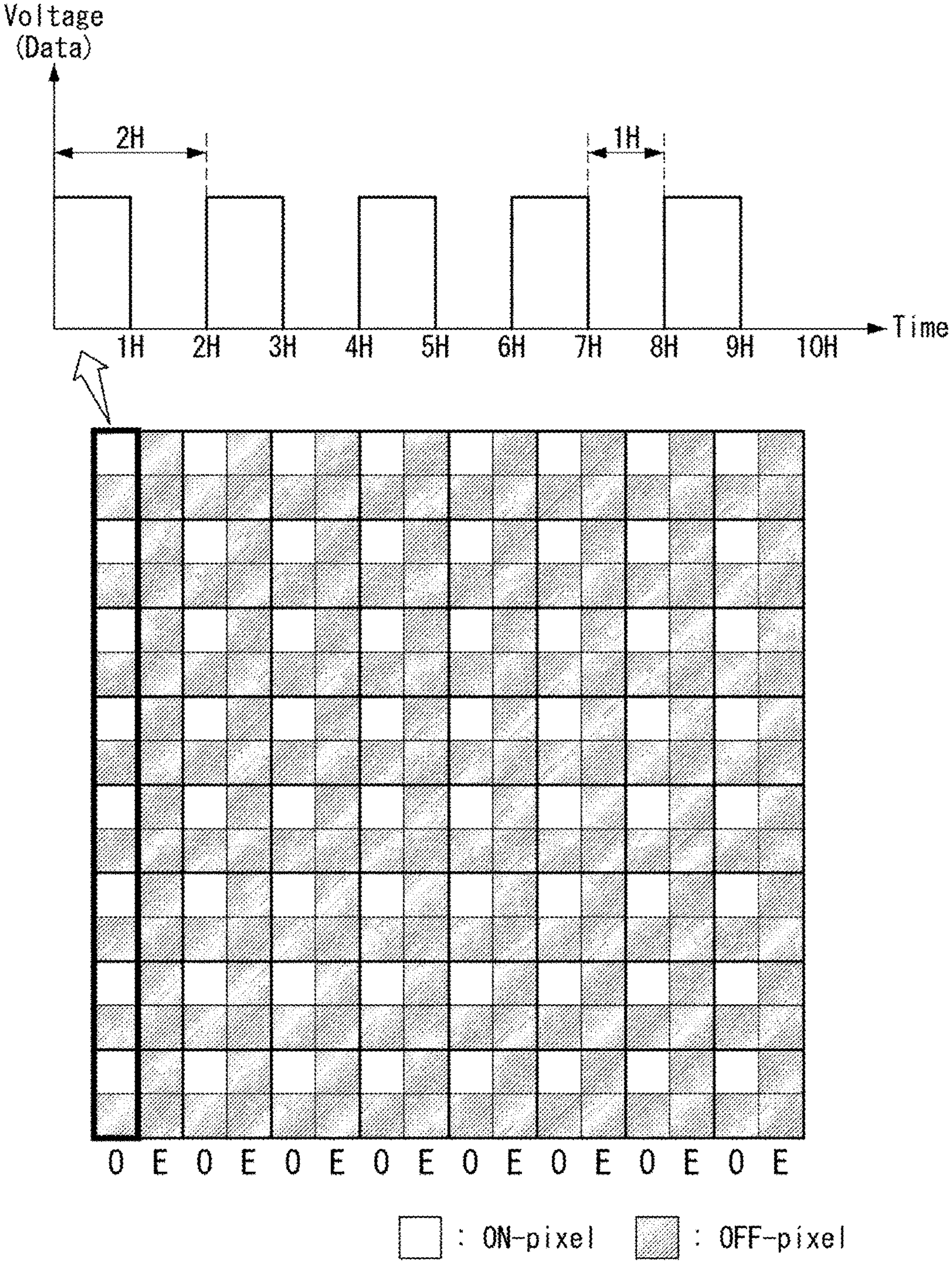
Figure 17:
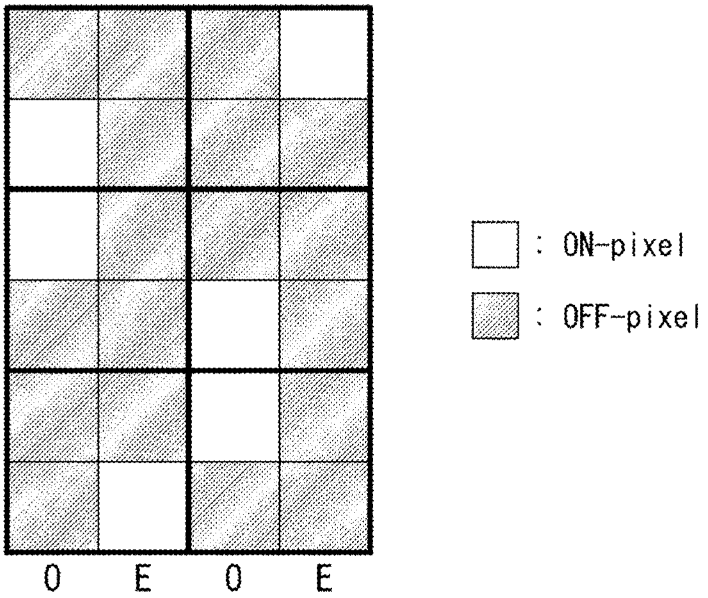
FIGS. 17 to 22 show an example where ON-pixels of blocks are positioned adjacent to each other so as to reduce the number of transitions of a data signal.
Figure 18:
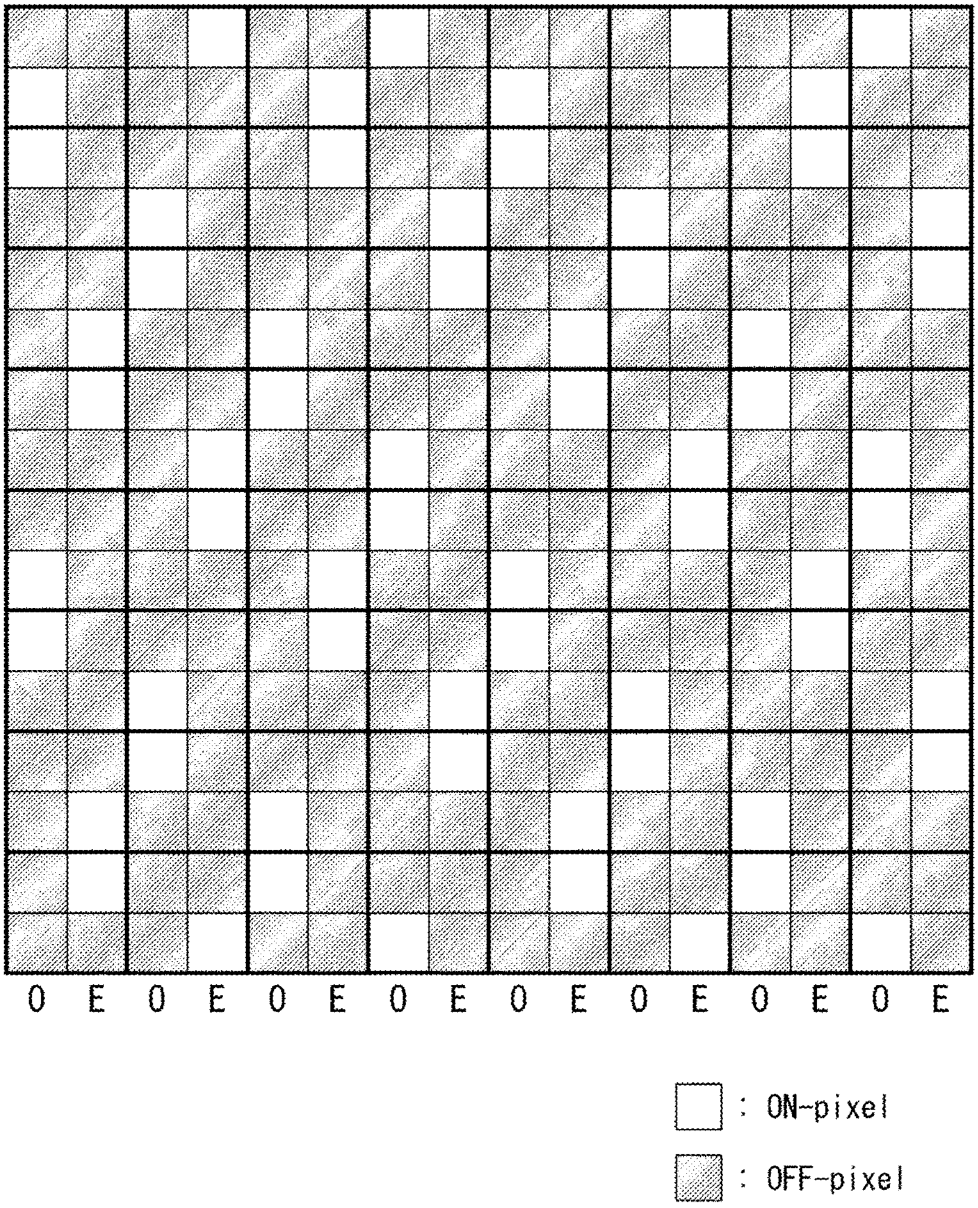
Figure 19:
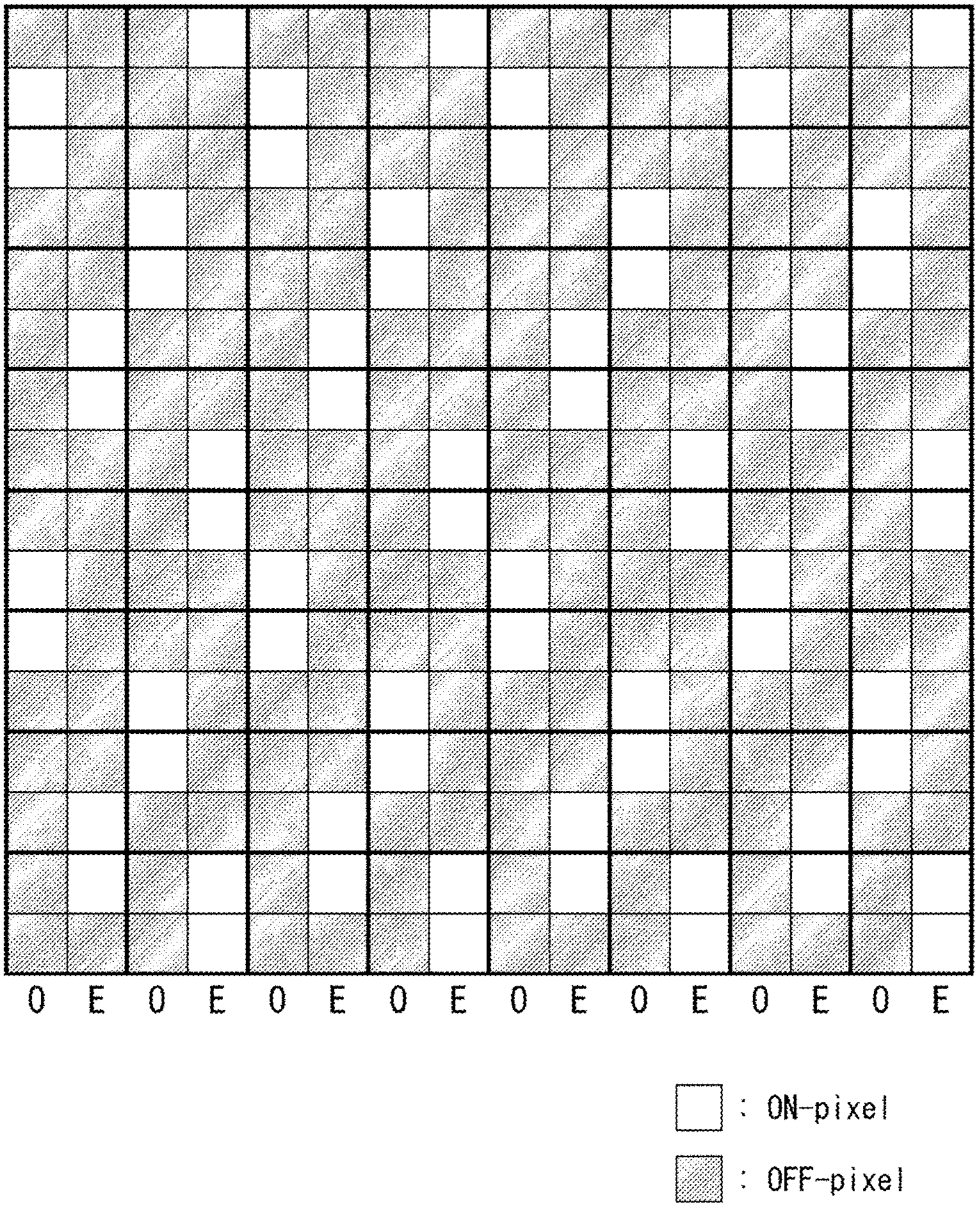
Figure 20:
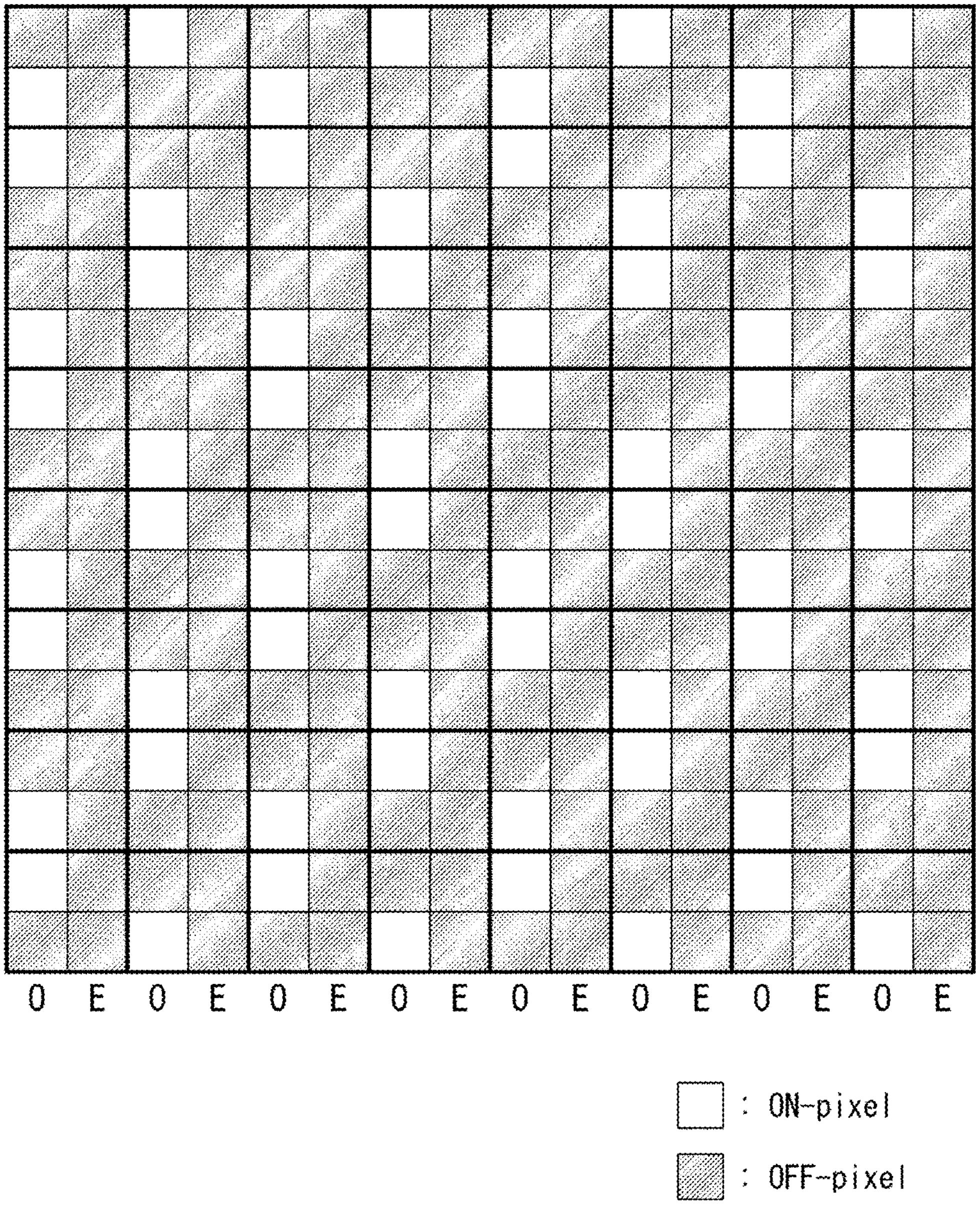

FIGS. 15 and 16 show an example where the number of transitions of the data signal increases when a distance between ON-pixels of blocks decreases.

Referring to FIGS. 15 and 16, when ON-pixels of blocks are disposed at the same location, the ON-pixels of the blocks are disposed at the same interval. A ratio of the ON-pixel to the number of pixels in each block is 1/4. As shown in FIG. 16, odd-numbered channels of the data driver 102 are connected to pixels arranged along odd-numbered columns (0) of the pixel array through the data lines DL. The ON-pixels on the odd-numbered columns (0) are separated from one another by one line therebetween. Thus, the data signal output through the odd-numbered channels of the data driver 102 is transitioned at an interval of one horizontal period 1H.

FIGS. 17 to 22 show an example where ON-pixels of blocks are positioned adjacent to each other so as to reduce the number of transitions of the data signal. For example, for a given column of pixels, each non-edge on-pixel in the given column is adjacent to an on-pixel from a different pixel block.

Referring to FIGS. 17 to 22, ON-pixels of adjacent blocks are positioned adjacent to each other. An ON-pixel group is defined as a group including ON-pixels adjacent to each other along a column direction (for example, y-axis direction), and an OFF-pixel group is defined as a group including adjacent OFF-pixels of blocks adjacent to each other along the column direction.

The ON-pixel groups and the OFF-pixel groups are alternately disposed along the column direction of the display panel 100. A length of the OFF-pixel group in the column direction is longer than a length of the ON-pixel group in the column direction. In the example shown in FIGS. 17 to 22, the ON-pixel group has a length of two pixels, and the OFF-pixel group has a length of six pixels. One OFF-pixel group exists between an Nth ON-pixel group and an (N+1)th ON-pixel group, which are positioned adjacent to each other along the column direction, where N is a positive integer. The adjacent ON-pixel groups are separated from each other with the OFF-pixel group longer than the ON-pixel group interposed therebetween. The data signal output through each of odd-numbered channels and even-numbered channels of the data driver 102 is not transitioned in the ON-pixel group. In the example shown in FIGS. 17 to 22, the data signal output through each of the odd-numbered channels and the even-numbered channels of the data driver 102 is transitioned every six horizontal periods 6H. When the block size increases, a distance between the ON-pixel groups increases. Therefore, a transition cycle of the data signal is not limited to FIGS. 17 to 22. Thus, the embodiment of the invention selects a location of the ON-pixel through a method shown in FIGS. 17 to 22 and thus can reduce the power consumption of the data driver 102. The special mode processing unit 130 selects the location of the ON-pixel. The timing controller 110 transmits data to be written on the ON-pixel to the data driver 102 and controls the operation timings of the data driver 102 and the gate driver 104.

When all of the pixels on one line arranged in a line direction (for example, x-axis direction) are OFF-pixels, the embodiment of the invention does not drive a channel of the gate driver 104 connected to the one line. When all of the pixels on one line are OFF-pixels, the one line is referred to as an OFF-pixel line. The gate driver 104 skips a scan line corresponding to the OFF-pixel line and supplies the scan signal only to other scan lines. Thus, the scan signal is not supplied to the OFF-pixel line.

The timing controller 110 decides the OFF-pixel line based on location information of the ON-pixel received from the special mode processing unit 130 and controls a skip drive of the gate driver 104. The timing controller 110 generates a gate timing control signal for controlling the operation timing of the gate driver 104. Channels of the gate driver 104, which are not driven, are floated and are separated from the scan line. Hence, power consumption is scarcely generated.

Figure 21:
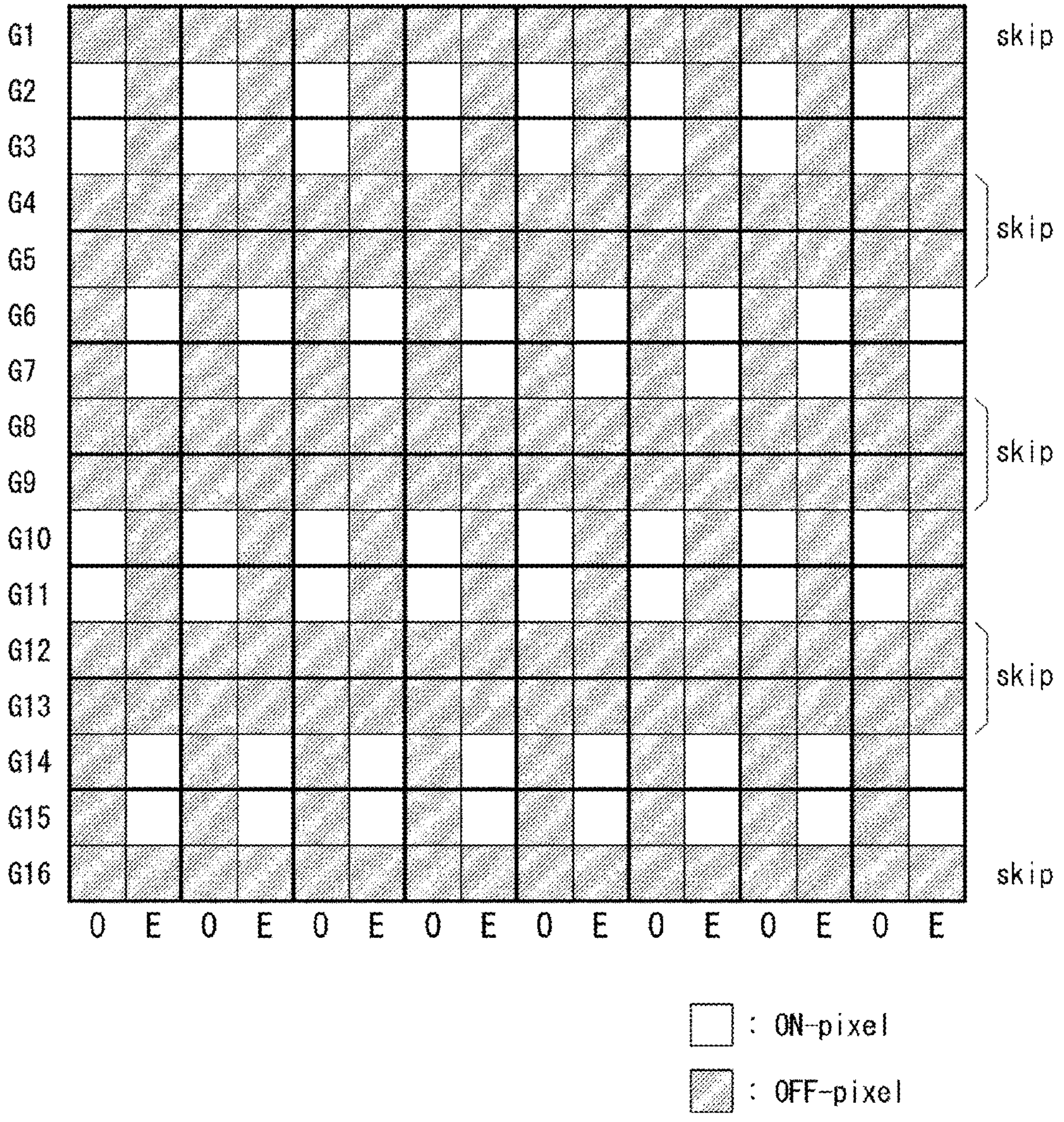
Figure 22:
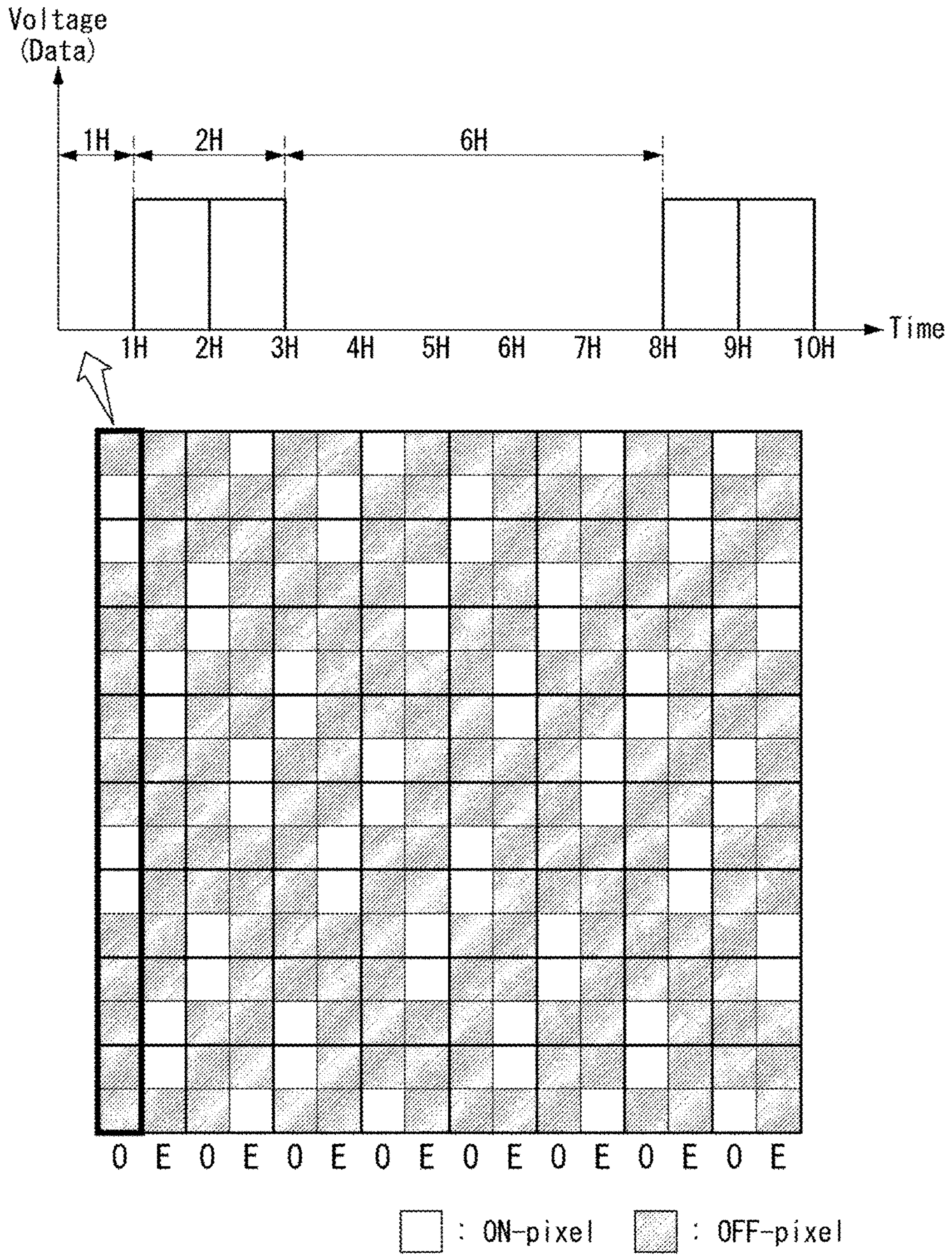
Figure 23:
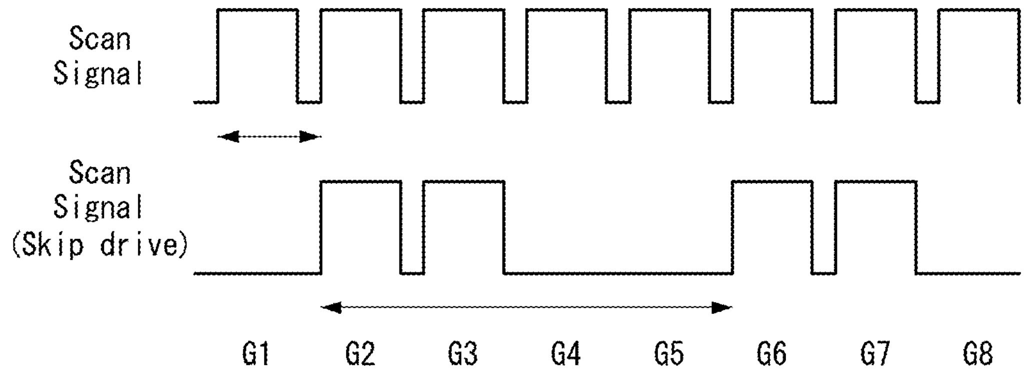
FIG. 23 is a waveform diagram showing a skip driving method of a gate driver applied to an example of FIG. 21.

FIG. 23 is a waveform diagram showing a skip driving method of the gate driver applied to the example of FIG. 21.

Referring to FIGS. 21 and 23, first, fourth, fifth, and eighth lines of the pixel array are OFF-pixel lines not having the ON-pixel. The gate driver 104 performs a skip drive under the control of the timing controller 110 and supplies the scan signal only to the scan lines connected to the ON-pixel. Channels of the gate driver 104 connected to scan lines G1, G4, G5, and G8 corresponding to the OFF-pixel lines are floated, and thus the power consumption is reduced.

When the block size increases, the pixel array may have an OFF-pixel column including only the OFF-pixels. In this instance, the data driver 102 performs the skip drive under the control of the timing controller 110 and supplies the data signal only to the data lines connected to the ON-pixel. Channels of the data driver 102 connected to the data line corresponding to the OFF-pixel column are floated, and thus the power consumption is reduced.

Figure 24:
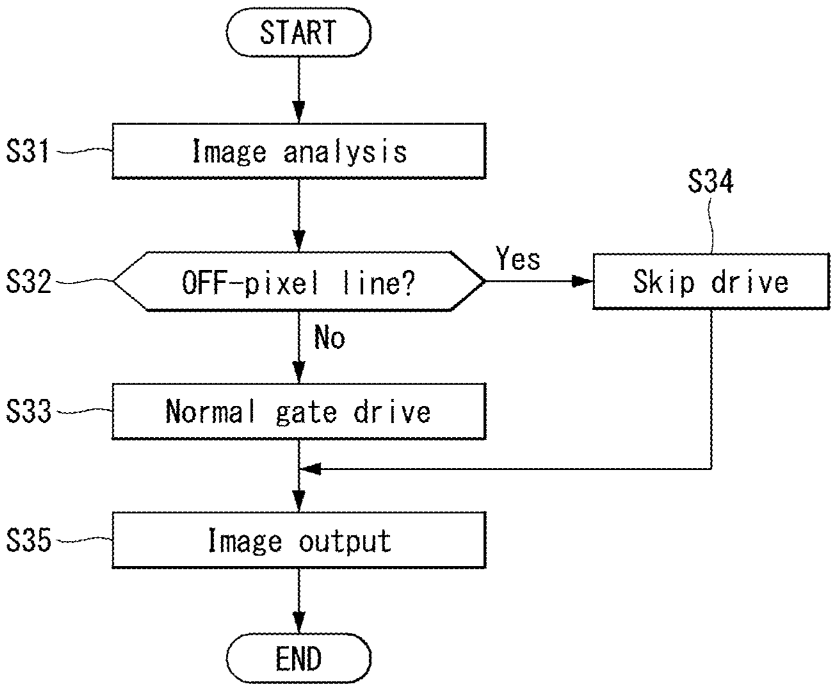
FIG. 24 is a flow chart showing a skip driving method according to an exemplary embodiment of the invention.
Figure 25:
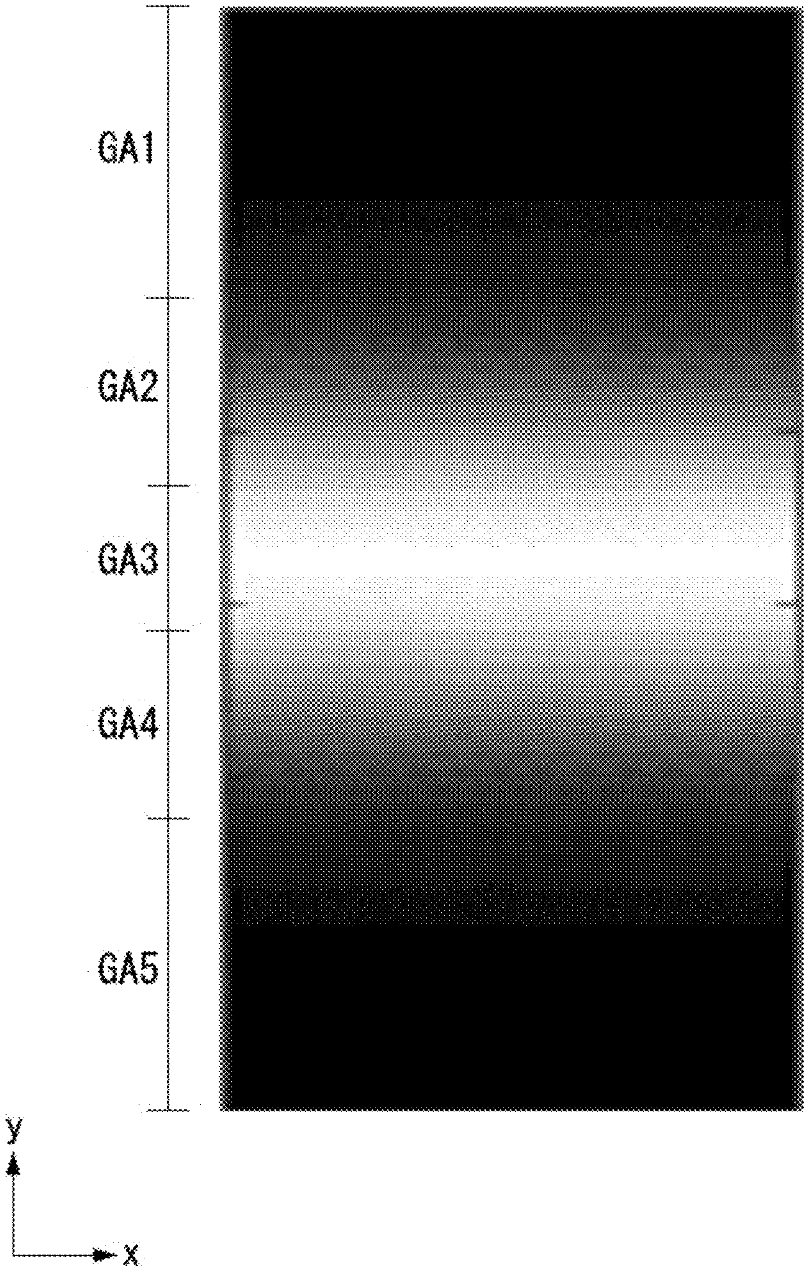
FIG. 25 shows an example where a change amount of a luminance of an image gradually changes in a column direction.
Figure 26:
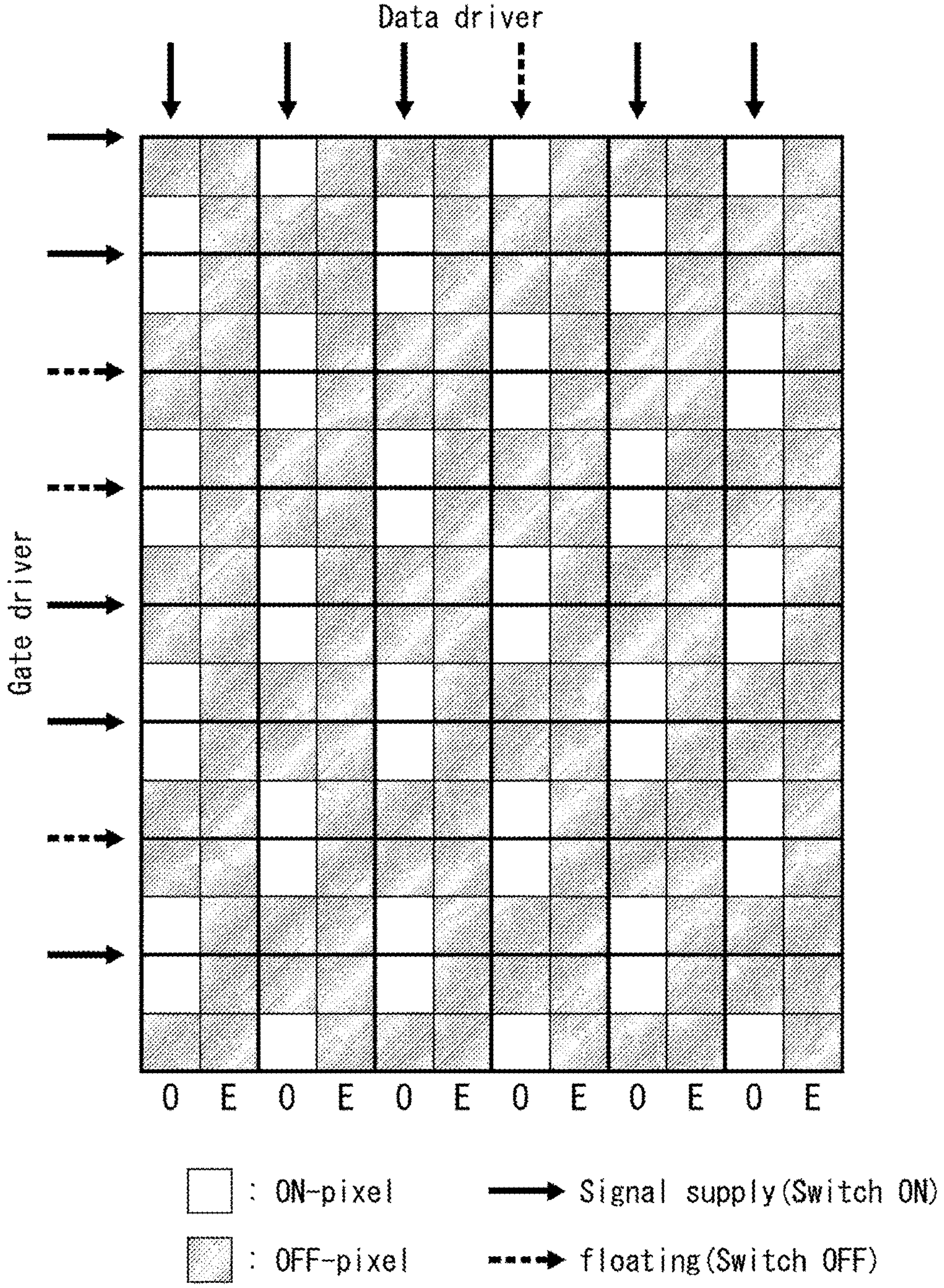
FIG. 26 shows an example of a skip driving method of a data driver and a gate driver.

The timing controller 110 adaptively controls a skip distance of each of the data driver 102 and the gate driver 104 based on the result of the image analysis as shown in FIGS. 24 to 26 and can minimize the power consumption without a reduction in the image quality the user can perceive. The skip distance means a distance between driven channels in each of the data driver 102 and the gate driver 104 (i.e., a distance between consecutive ON-pixel lines each having at least one ON-pixel separated by OFF-pixel lines having only OFF-pixels). The channels within the skip distance have non-driven channels.

FIG. 24 is a flow chart showing a skip driving method according to the embodiment of the invention. FIG. 25 shows an example where a change amount of a luminance of an image gradually changes in the column direction. FIG. 26 shows an example of a skip driving method of the data driver and the gate driver.

Referring to FIGS. 24 to 26, the special mode processing unit 130 analyzes a change amount of the luminance/the gray level of the input image and widely controls the skip distance of the data driver 102 and/or the gate driver 104 in portions GA1, GA3, and GA5 having a relatively small change amount (e.g., below a change threshold). Even if the skip distance increases in a portion having a small change amount of the luminance/the gray level of the input image, a reduction in the image quality may be a little. However, when the skip distance increases in a portion having a large change amount of the luminance/the gray level of the input image, a reduction in the image quality may be perceived. Thus, the special mode processing unit 130 narrowly controls the skip distance of the data driver 102 and/or the gate driver 104 in portions GA2 and GA4 having a relatively large change amount of the luminance/the gray level of the input image (e.g., above a change threshold).

The special mode processing unit 130 causes a skip distance in the dark portions GA1 and GA5 having a low average luminance/a low average gray level among the portions GA1, GA3, and GA5 having the relatively small change amount of the luminance/the gray level to be greater than a skip distance in the bright portion GA3. The special mode processing unit 130 does not select the ON-pixel within the skip distance. The timing controller 110 skip-drives the data driver 102 and/or the gate driver 104 based on the location information of the ON-pixel received from the special mode processing unit 130 and changes a skip distance depending on the input image.

As described above, the embodiment of the invention changes the location of the ON-pixel when the stress of the ON-pixel of the block increases to a value equal to or greater than a predetermined level, thereby reducing the stress of each pixel and the stress deviation between the pixels. Hence, the image quality and the lifespan of the display device can be improved.

The embodiment of the invention adjusts the block size and/or the ON-pixel ratio based on the result of an analysis of the input image and thus can further reduce the stress of each pixel without a reduction in the image quality the user can perceive.

Furthermore, the embodiment of the invention controls the display panel driving circuit in the portion not having the ON-pixel through the skip driving method and thus reduces the power consumption. The embodiment of the invention adaptively controls the skip distance based on the result of an analysis of the input image and can minimize the power consumption of the display panel driving circuit without a reduction in the image quality the user can perceive.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for driving a display panel to display an image, the method comprising:

configuring the display panel to operate in a special operation mode, the display panel comprising a plurality of pixels;

determining, by a special operation mode processor, a pixel block size for blocking the plurality of pixels into a plurality of pixel blocks and determining a first set of on-pixels and an first set of off-pixels, the first set of on-pixels including at least a first group of pixels comprising at least one pixel in each of the plurality of pixel blocks and the first set of off-pixels including at least a second group of pixels comprising at least one pixel in each of the plurality of blocks;

turning on the first set of on-pixels and turning off the first set of off-pixels;

generating a drive history representative value for the first group of pixels, the drive history representative value representing a drive time and drive characteristic for the first group of pixels;

comparing the drive history representative value with a threshold value;

responsive to the drive history representative value exceeding the threshold value, determining a second set of on-pixels and a second set of off-pixels, the second set of on-pixels including at least the second group of pixels and the second set of off-pixels including at least the first group of pixels; and turning on the second set of on-pixels and turning off the second set of off-pixels.

2. The method of claim 1, further comprising:

configuring the display panel to operate in a normal operation mode; and while in the normal operation mode, turning on the first and second groups of pixels.

3. The method of claim 1, wherein determining the pixel block size and determining the first set of on-pixels and the first set of off-pixels comprises:

performing an image analysis of the image; and based on the image analysis, determining a desired drive ratio for driving the display panel;

determining the pixel block size, the first set of on-pixels, and the first set of off-pixels such that a total number of pixels in the first set of on-pixels to a total number of pixels in the image matches the desired drive ratio.

4. The method of claim 1, wherein determining the pixel block size and determining the first set of on-pixels and the first set of off-pixels comprises:

determining a resolution of the input image; and responsive to the resolution of the input image being above a resolution threshold, determining the pixel block size, the first set of on-pixels, and the first set of off-pixels to meet a first on-pixel ratio representing a ratio of a total number of pixels in the first set of on-pixels to a total number of pixels in the image; and responsive to the resolution of the input image being below the resolution threshold, determining the pixel block size, the first set of on-pixels, and the first set of off-pixels to meet a second on-pixel ratio lower than the first on-pixel ratio.

5. The method of claim 1, determining the pixel block size and determining the first set of on-pixels and the first set of off-pixels comprises:

determining an average luminance of the input image; and responsive to the average luminance of the input image being above a luminance threshold, determining the pixel block size, the first set of on-pixels, and the first set of off-pixels to meet a first on-pixel ratio representing a ratio of a total number of pixels in the first set of on-pixels to a total number of pixels in the image; and responsive to the average luminance of the input image being below the luminance threshold, determining the pixel block size, the first set of on-pixels, and the first set of off-pixels to meet a second on-pixel ratio lower than the first on-pixel ratio.

6. The method of claim 1, determining the pixel block size and determining the first set of on-pixels and the first set of off-pixels comprises:

determining an motion metric of the input image; and responsive to the motion metric of the input image being above a motion threshold, determining the pixel block size, the first set of on-pixels, and the first set of off-pixels to meet a first on-pixel ratio representing a ratio of a total number of pixels in the first set of on-pixels to a total number of pixels in the image; and responsive to the motion metric of the input image being below the motion threshold, determining the pixel block size, the first set of on-pixels, and the first set of off-pixels to meet a second on-pixel ratio lower than the first on-pixel ratio.

7. The method of claim 1, determining the pixel block size and determining the first set of on-pixels and the first set of off-pixels comprises:

determining a complexity metric of the input image representing a number and distribution of edges; and responsive to the complexity metric of the input image being above a complexity threshold, determining the pixel block size, the first set of on-pixels, and the first set of off-pixels to meet a first on-pixel ratio representing a ratio of a total number of pixels in the first set of on-pixels to a total number of pixels in the image; and responsive to the complexity metric of the input image being below the complexity threshold, determining the pixel block size, the first set of on-pixels, and the first set of off-pixels to meet a second on-pixel ratio lower than the first on-pixel ratio.

8. The method of claim 1, wherein determining the pixel block size and determining the first set of on-pixels and the first set of off-pixels comprises:

determining a gray level distribution of the input image; and responsive to the gray level distribution of the input image being above a gray level distribution threshold, determining the pixel block size, the first set of on-pixels, and the first set of off-pixels to meet a first on-pixel ratio representing a ratio of a total number of pixels in the first set of on-pixels to a total number of pixels in the image; and responsive to the gray level distribution of the input image being below the gray level distribution threshold, determining the pixel block size, the first set of on-pixels, and the first set of off-pixels to meet a second on-pixel ratio lower than the first on-pixel ratio.

9. The method of claim 1, wherein determining the pixel block size and determining the first set of on-pixels and the first set of off-pixels comprises:

separating the image into foreground pixels representative of foreground objects and background pixels representative of a background scene of the image;

determining, for the foreground pixels, a foreground pixel block size, a foreground set of on-pixels, and a foreground set of off-pixels to meet a foreground on-pixel ratio; and determining, for the background pixels, a background pixel block size, a background set of on-pixels, and a background set of off-pixels to meet a background on-pixel ratio, lower than the foreground on-pixel ratio.

10. The method of claim 1, wherein the first group of pixels are positioned at corresponding first pixel locations within each of the plurality of pixel blocks and wherein the second group of pixels are positioned at corresponding second locations within each of the plurality of pixel blocks.

11. The method of claim 1, wherein the first set of on-pixels are positioned such that for a given column of pixels in the image, each non-edge on-pixel in the given column is adjacent to an on-pixel from a different pixel block.

12. The method of claim 1, wherein turning on the on-pixels and turning off the off-pixels comprises:

generating, by a gate driver, scan line signals to sequentially turn on rows of pixels having at least one on-pixel; and floating, by the gate driver, a scan line corresponding to an off-pixel line comprising a row of pixels having only off-pixels to skip scanning of the off-pixel line.

13. The method of claim 1, wherein turning on the on-pixels and turning off the off-pixels comprises:

generating, by a data driver, data line signals to sequentially provide pixel data to columns of pixels having at least one on-pixel; and floating, by the data driver, a data line corresponding to an off-pixel column comprising only off-pixels to skip providing data to the off-pixel column.

14. The method of claim 1, wherein determining the pixel block size and determining the first set of on-pixels and the first set of off-pixels comprises:

determining a change in luminance in a first region of the image;

responsive to the change in luminance being above a change threshold, determining the first set of on-pixels such that skip distances between on-pixel lines in the first region are below a distance threshold, wherein the on-pixel lines each have at least one on-pixel and wherein the skip distance represents a distance between consecutive on-pixel lines separated by off-pixel lines having only off-pixels; and responsive to the change in luminance being below the change threshold, determining the first set of on-pixels such that the skip distances between on-pixel lines in the first region are above the distance threshold.

15. A display panel for displaying an image comprising:

a gate driver to supply scan signals to rows of pixels having one or more on-pixels that are turned on during a special operation mode, the scan signals to activate the rows of pixels for displaying data; and a data driver to supply data signals to columns of pixels having one or more of the on-pixels that are turned on during the special operation mode, the data signals to drive the on-pixels according to pixel data and to turn off off-pixels that are turned off during the special operation mode;

a special operation mode processor to operate when the display panel is configured in the special operation mode, the special operation mode processor to determine a pixel block size for blocking the plurality of pixels into a plurality of pixel blocks and determine a first set of on-pixels and a first set of off-pixels, the first set of on-pixels including at least a first group of pixels comprising at least one pixel in each of the plurality of pixel blocks and the first set of off-pixels including at least a second group of pixels comprising at least one pixel in each of the plurality of blocks, the special operation mode processor further to generate a drive history representative value for the first group of pixels, the drive history representative value representing a drive time and drive characteristic for the first group of pixels, compare the drive history representative value with a threshold value, and responsive to the drive history representative value exceeding the threshold value, determine a second set of on-pixels including at least the second group of pixels and a second set of off-pixels including at least the first group of pixels.

16. The display panel of claim 15, wherein the special operation mode processor comprises:

an image analyzer to perform an image analysis of the image; and a special mode controller to determine a desired drive ratio for driving the display panel based on the image analysis and to determine the pixel block size, the first set of on-pixels, and the first set of off-pixels such that a total number of pixels in the first set of on-pixels to a total number of pixels in the image matches the desired drive ratio.

17. The display panel of claim 15, further comprising:

an image analyzer to determine a resolution of the image; and a special mode controller to determine the pixel block size, the first set of on-pixels, and the first set of off-pixels to meet a first on-pixel ratio representing a ratio of a total number of pixels in the first set of on-pixels to a total number of pixels in the image responsive to the resolution of the input image being above a resolution threshold, and to determine the first set of on-pixels, and the first set of off-pixels to meet a second on-pixel ratio lower than the first on-pixel ratio responsive to the resolution of the input image being below the resolution threshold, determining the pixel block size.

18. The display panel of claim 15, further comprising:

an image analyzer to determine an average luminance of the image; and a special mode controller to determine the pixel block size, the first set of on-pixels, and the first set of off-pixels to meet a first on-pixel ratio representing a ratio of a total number of pixels in the first set of on-pixels to a total number of pixels in the image responsive to the average luminance of the input image being above a luminance threshold, and to determine the first set of on-pixels, and the first set of off-pixels to meet a second on-pixel ratio lower than the first on-pixel ratio responsive to the average luminance of the input image being below the luminance threshold, determining the pixel block size.

19. The display panel of claim 15, wherein the gate driver is further configured to float a scan line corresponding to an off-pixel line comprising a row of pixels having only off-pixels to skip scanning of the off-pixel line.

20. A non-transitory computer-readable storage medium storing instructions executable by a processor for driving a display panel to display an image, the instructions when executed causing the processor to perform steps including:

configuring the display panel to operate in a special operation mode, the display panel comprising a plurality of pixels;

determining a pixel block size for blocking the plurality of pixels into a plurality of pixel blocks and determining a first set of on-pixels and an first set of off-pixels, the first set of on-pixels including at least a first group of pixels comprising at least one pixel in each of the plurality of pixel blocks and the first set of off-pixels including at least a second group of pixels comprising at least one pixel in each of the plurality of blocks;

turning on the first set of on-pixels and turning off the first set of off-pixels;

generating a drive history representative value for the first group of pixels, the drive history representative value representing a drive time and drive characteristic for the first group of pixels;

comparing the drive history representative value with a threshold value;

responsive to the drive history representative value exceeding the threshold value, determining a second set of on-pixels and a second set of off-pixels, the second set of on-pixels including at least the second group of pixels and the second set of off-pixels including at least the first group of pixels; and turning on the second set of on-pixels and turning off the second set of off-pixels.

* * * * *